United States Patent [19]
Wakeland

[11] Patent Number: 5,966,116
[45] Date of Patent: Oct. 12, 1999

[54] METHOD AND LOGIC SYSTEM FOR THE ROTATION OF RASTER-SCAN DISPLAY IMAGES

[75] Inventor: Carl K. Wakeland, Austin, Tex.

[73] Assignee: Advanced Micro Devices, Inc., Sunnyvale, Calif.

[21] Appl. No.: 08/839,262

[22] Filed: Apr. 17, 1997

Related U.S. Application Data

[63] Continuation of application No. 08/418,549, Apr. 4, 1995, abandoned.

[51] Int. Cl.$^6$ .................................................. G09G 5/34
[52] U.S. Cl. ........................... 345/126; 345/509; 345/515; 345/516; 382/296; 348/583
[58] Field of Search ................................ 345/126, 7, 121, 345/509, 515, 516, 511; 382/296, 297; 348/583

[56] References Cited

U.S. PATENT DOCUMENTS

| | | | |
|---|---|---|---|
| 4,245,321 | 1/1981 | Gennetten | 345/126 |
| 4,542,377 | 9/1985 | Hagen et al. | 345/126 |
| 4,593,407 | 6/1986 | Konishi et al. | 345/126 |
| 4,611,232 | 9/1986 | Searby | 345/126 |
| 4,636,783 | 1/1987 | Omachi | 345/126 |
| 4,806,920 | 2/1989 | Sawada | 345/126 |
| 4,929,085 | 5/1990 | Kajihara | 382/297 |
| 4,930,088 | 5/1990 | Horiguchi | 395/137 |
| 5,034,733 | 7/1991 | Okazawa et al. | 382/297 |
| 5,063,526 | 11/1991 | Kagawa et al. | 345/126 |
| 5,111,192 | 5/1992 | Kadakia | 345/126 |
| 5,124,692 | 6/1992 | Sasson | 345/126 |
| 5,189,404 | 2/1993 | Masimo et al. | 345/126 |
| 5,384,645 | 1/1995 | Hasegawa et al. | 382/296 |
| 5,412,768 | 5/1995 | Ozaki | 395/137 |
| 5,426,733 | 6/1995 | Masai | 395/137 |

FOREIGN PATENT DOCUMENTS

| | | | |
|---|---|---|---|
| 0 137 147 | 4/1985 | European Pat. Off. . | |
| 0188678 | 7/1986 | European Pat. Off. | 382/297 |
| 0216 501 | 1/1987 | European Pat. Off. . | |
| 0 346 489 | 12/1989 | European Pat. Off. . | |
| 0 431 581 | 6/1991 | European Pat. Off. . | |
| 0431581 | 6/1991 | European Pat. Off. | 345/126 |
| 0 569 218 | 11/1993 | European Pat. Off. . | |
| 4128884 | 4/1992 | Japan | 345/126 |
| 3002544 | 10/1983 | Netherlands | 345/126 |

OTHER PUBLICATIONS

Kornfeld, C., "Fast Methods for Orthogonally Reorienting Bitmap Images," Proceedings of the Society for Information Display (SID) vol. 28, No. 4, 1987, New York, NY, pp. 431–438, XP 000046093.

International Search Report of PCT/US96/04682 dated Sep. 18, 1996.

*Primary Examiner*—Bipin H. Shalwala
*Assistant Examiner*—Kent Chang
*Attorney, Agent, or Firm*—Conley, Rose & Tayon; Robert C. Kowert; Kevin L. Daffer

[57] ABSTRACT

A computer system is provided which employs a hardware rotation unit capable of rotating a raster-scan portrait image by 90 degrees in a clockwise or counter-clockwise direction in order to create a landscape image on a raster-scan display device. Rotation of a portrait image is accomplished by a mapping of pixel information associated with the portrait image to corresponding frame buffer locations necessary to properly display the portrait image as a landscape image. A video controller incorporating the hardware rotation unit stores only pixel information associated with the landscape image in a frame buffer. Dedicated circuitry within the hardware rotation unit allows full support of portrait image data read and write operations involving the landscape image pixel information stored in the frame buffer.

19 Claims, 10 Drawing Sheets

METHOD AND LOGIC SYSTEM FOR THE ROTATION OF RASTER-SCAN DISPLAY IMAGES

This application is a continuation of application Ser. No. 08/418,549, filed Apr. 4, 1995, now abandoned.

BACKGROUND OF THE INVENTION

1. Field of the Invention

This invention relates to computer graphics systems and more particularly to the rotation of video display images in video display systems employing raster-scan display techniques.

2. Description of the Relevant Art

Most computer systems use video display systems which employ the same raster-scan display techniques used in television sets. Digital video information stored in a memory system is used by a video display system to create an image on the screen of a display device such as a cathode ray tube, a flat-panel display, or a liquid crystal display.

Video display systems employing raster-scan display techniques typically store images as horizontal rows of their component points, or pixels. Images are "painted" on a screen of a display device point by point, line by line, from the top of the screen to the bottom. The need to recreate images on the screen of a display device many times each second is a characteristic many video display systems employing raster-scan techniques share. The light output of a cathode ray tube fades quickly, hence a video display system with a cathode ray tube display device must refresh an image many times each second to avoid flicker. An image created on a flat-panel display must be refreshed many times each second in order to produce varying shades of gray, or to produce a color scale if the display device is capable of displaying color information.

Pixel information corresponding to each point on a screen of a display device is typically stored in a memory element called a frame buffer. This pixel information includes the intensity (i.e., brightness) of a point to be displayed, and may also include color information if the display device has the ability to display colors. Most frame buffers are comprised of a large number of storage locations in a semiconductor memory system. Indeed, it was the availability of relatively inexpensive semiconductor memory systems which made raster-scan display systems cost effective. Pixel information is typically stored in a frame buffer in the order in which each pixel is to be displayed on a screen of a display device. The number of pixels per horizontal scan line and the number of horizontal scan lines per display screen determine the resolution of a raster-scan display system.

A block diagram of a typical raster-scan video display system is shown in FIG. 1. A CPU is coupled to a system bus, and a video controller is also coupled to the system bus. A display device is coupled to the video controller. The CPU sends video information to the video controller in digital form via the system bus. The video controller converts this digital video information to signals used by the display device to display raster-scan images.

Turning now to FIG. 2, a block diagram of a conventional video controller as provided in FIG. 1 is shown. The video controller comprises a bus interface unit, a frame buffer, and an image display system. The bus interface unit is coupled to the system bus and to the frame buffer. The frame buffer is coupled to the image display system. The image display system is coupled to the display device. The bus interface unit serves as the interface between the system bus and the video controller. Video information is stored in the frame buffer in digital form. Each memory location of the frame buffer contains the information associated with one or more pixels to be displayed. The image display system fetches digital pixel information from the frame buffer, converts the digital information to signals the display device can use, and provides these signals to the display device. The image display system may cycle through the digital pixel information stored in the frame buffer many times each second to recreate the image on the screen of the display device. Frame buffer memory addresses may be generated in synchronism with the raster scan of the display device, and the contents of each memory location in the frame buffer may be used to control the image display process.

SUMMARY OF THE INVENTION

A method and logic system for the rotation of raster-scan display images comprise the present invention. The method and logic system described embody all the functions required to rotate a raster-scan portrait image by 90 degrees in a clockwise or counter-clockwise direction in order to create a landscape image on a raster-scan display device. As defined herein, a "landscape image" is any image which may be displayed on a display device and oriented plus or minus 90 degrees relative to a portrait image from which the landscape image is produced. Rotation of a portrait image is accomplished by a mapping of pixel information associated with said portrait image to corresponding frame buffer locations necessary to properly display said portrait image as a landscape image. Image rotations are herein accomplished entirely in hardware. A hardware rotation unit includes dedicated circuitry which allows a video controller incorporating said hardware rotation unit to fully support portrait image data read and write operations involving pixel information stored in a frame buffer. A video controller incorporating a hardware rotation unit stores only pixel information associated with a landscape image in a frame buffer. Said dedicated circuitry allows pixel information associated with a portrait image to be reconstructed from stored pixel information associated with a landscape image. Thus said dedicated circuitry allows image translation to occur in a manner "transparent" to devices accessing a video controller, which incorporates a hardware rotation unit, from a system bus.

BRIEF DESCRIPTION OF THE DRAWINGS

Other objects and advantages of the invention will become apparent upon reading the following detailed description and upon reference to the accompanying drawings in which.

Figure 2:
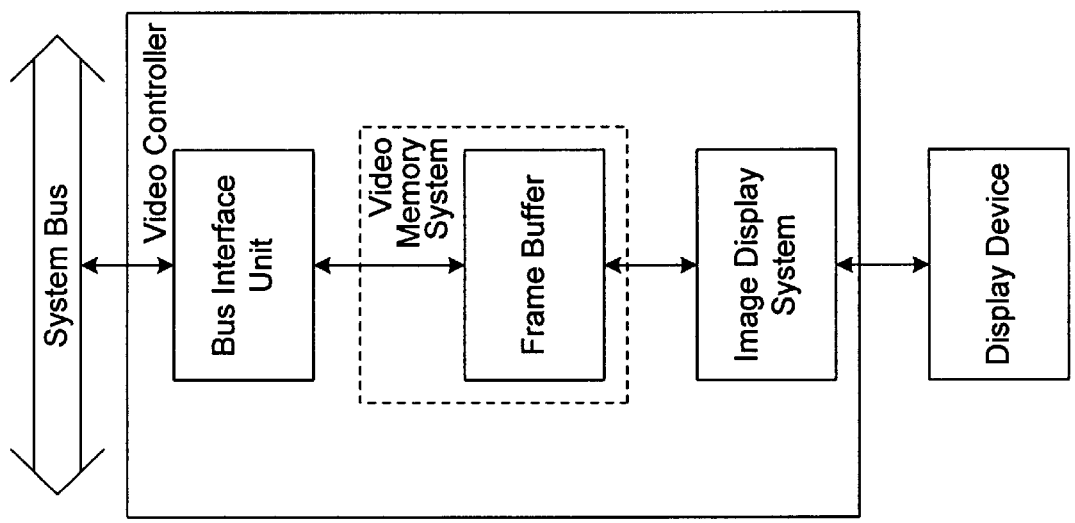
FIG. 2 is a block diagram of a video controller of a typical raster-scan display system.
Figure 1:
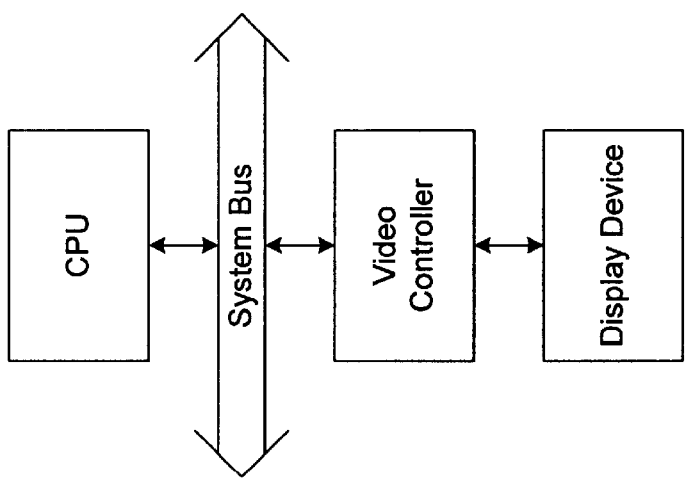
FIG. 1 is a block diagram of a typical raster-scan video display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
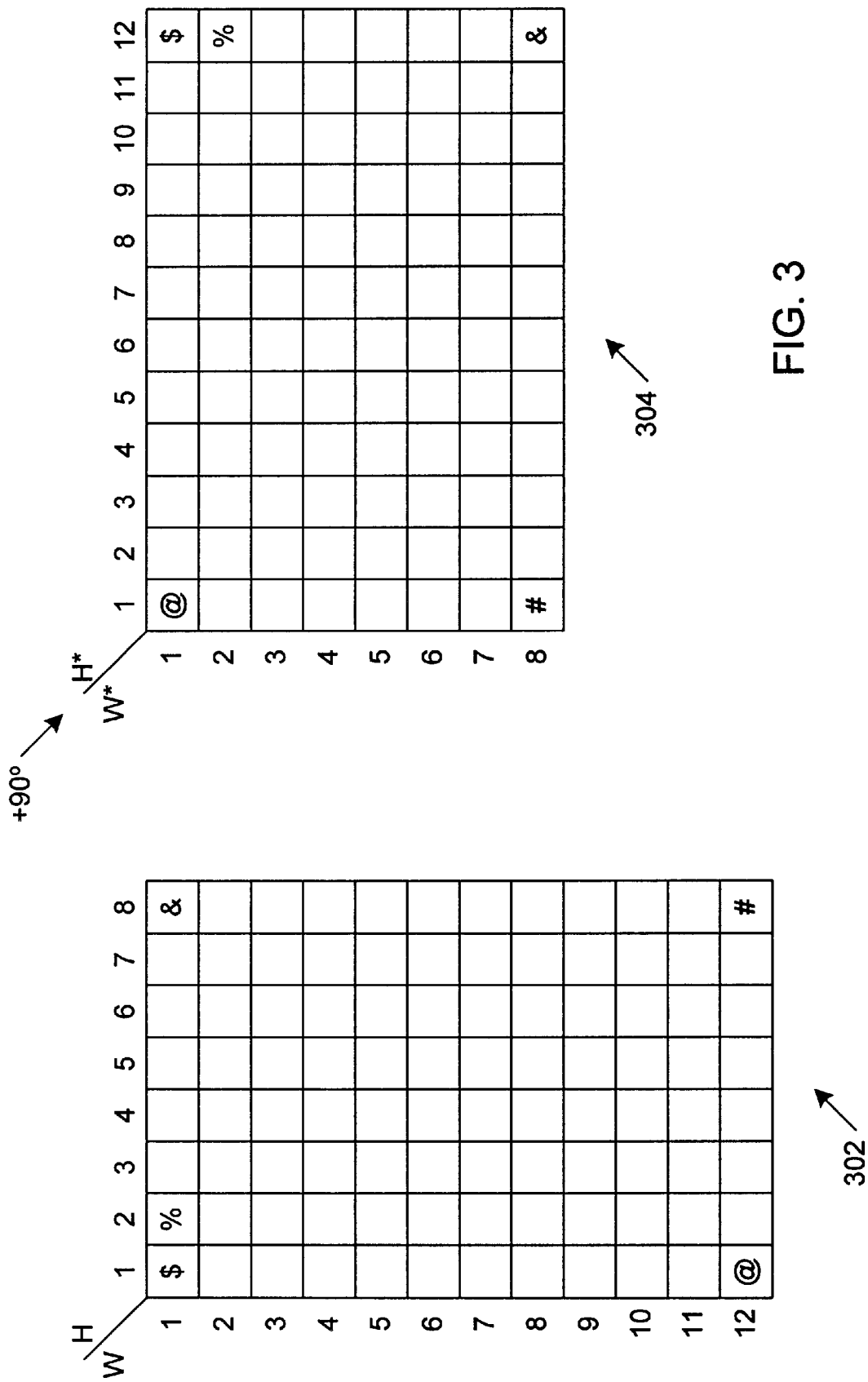
FIG. 3 is a diagram illustrating a rotation operation performed on the digital information pertaining to a raster-scan display image, wherein each byte of data in a frame buffer contains information associated with a single pixel.

Turning to FIG. 3, a diagram illustrating an image rotation operation performed by mapping the digital information associated with a portrait image 302 to a frame buffer storage location associated with a landscape image 304 is shown. In this example, each byte in a frame buffer contains digital information associated with one pixel. Portrait image 302 is a pixel grid composed of 12 horizontal lines of pixel positions (dimension W), with 8 pixel positions per line (dimension H). As mentioned previously, raster-scan images are "painted" on the screen of a display device pixel-by-pixel, line-by-line, from the top of the screen to the bottom. Here we assume one byte of digital information is associated with each pixel, and that each memory location in the frame buffer stores one byte of digital information. Thus each pixel is mapped to a single memory location in the frame buffer. Pixel information is stored in the frame buffer in the order in which it is accessed to create an image. If frame buffer memory addresses begin at location 0, information pertaining to a pixel located at coordinates (W, H) are found at the memory locations in the frame buffer as shown in Table 1 below.

TABLE 1

Frame Buffer Memory Locations
for Pixel Information of Portrait Image 302.

| W | H | Memory Location |
|---|---|---|
| 1 | 1 | 0 |
| 1 | 2 | 1 |
| 1 | 3 | 2 |
| 1 | 4 | 3 |
| 1 | 5 | 4 |
| 1 | 6 | 5 |
| 1 | 7 | 6 |
| 1 | 8 | 7 |

TABLE 1-continued

Frame Buffer Memory Locations
for Pixel Information of Portrait Image 302.

| W | H | Memory Location |
|---|---|---|
| 2 | 1 | 8 |
| 2 | 2 | 9 |
| 2 | 3 | 10 |
| 2 | 4 | 11 |
| 2 | 5 | 12 |
| 2 | 6 | 13 |
| 2 | 7 | 14 |
| 2 | 8 | 15 |
| 3 | 1 | 16 |
| 3 | 2 | 17 |
| 3 | 3 | 18 |
| 3 | 4 | 19 |
| 3 | 5 | 20 |
| 3 | 6 | 21 |
| 3 | 7 | 22 |
| 3 | 8 | 23 |
| 4 | 1 | 24 |
| 4 | 2 | 25 |
| 4 | 3 | 26 |
| 4 | 4 | 27 |
| 4 | 5 | 28 |
| 4 | 6 | 29 |
| 4 | 7 | 30 |
| 4 | 8 | 31 |
| 5 | 1 | 32 |
| 5 | 2 | 33 |
| 5 | 3 | 34 |
| 5 | 4 | 35 |
| 5 | 5 | 36 |
| 5 | 6 | 37 |
| 5 | 7 | 38 |
| 5 | 8 | 39 |
| 6 | 1 | 40 |
| 6 | 2 | 41 |
| 6 | 3 | 42 |
| 6 | 4 | 43 |
| 6 | 5 | 44 |
| 6 | 6 | 45 |
| 6 | 7 | 46 |
| 6 | 8 | 47 |
| 7 | 1 | 48 |
| 7 | 2 | 49 |
| 7 | 3 | 50 |
| 7 | 4 | 51 |
| 7 | 5 | 52 |
| 7 | 6 | 53 |
| 7 | 7 | 54 |
| 7 | 8 | 55 |
| 8 | 1 | 56 |
| 8 | 2 | 57 |
| 8 | 3 | 58 |
| 8 | 4 | 59 |
| 8 | 5 | 60 |
| 8 | 6 | 61 |
| 8 | 7 | 62 |
| 8 | 8 | 63 |
| 9 | 1 | 64 |
| 9 | 2 | 65 |
| 9 | 3 | 66 |
| 9 | 4 | 67 |
| 9 | 5 | 68 |
| 9 | 6 | 69 |
| 9 | 7 | 70 |
| 9 | 8 | 71 |
| 10 | 1 | 72 |
| 10 | 2 | 73 |
| 10 | 3 | 74 |
| 10 | 4 | 75 |
| 10 | 5 | 76 |
| 10 | 6 | 77 |
| 10 | 7 | 78 |
| 10 | 8 | 79 |
| 11 | 1 | 80 |

TABLE 1-continued

Frame Buffer Memory Locations
for Pixel Information of Portrait Image 302.

| W | H | Memory Location |
|---|---|---|
| 11 | 2 | 81 |
| 11 | 3 | 82 |
| 11 | 4 | 83 |
| 11 | 5 | 84 |
| 11 | 6 | 85 |
| 11 | 7 | 86 |
| 11 | 8 | 87 |
| 12 | 1 | 88 |
| 12 | 2 | 89 |
| 12 | 3 | 90 |
| 12 | 4 | 91 |
| 12 | 5 | 92 |
| 12 | 6 | 93 |
| 12 | 7 | 94 |
| 12 | 8 | 95 |

Landscape image 304 is a pixel grid composed of 8 horizontal lines of pixel positions (dimension W*), with 12 pixel positions per line (dimension H*). The translation of portrait image 302 to landscape image 304 involves rotating portrait image 302 by 90 degrees in a clockwise direction as shown in FIG. 3. Properly displaying the rotated portrait image 302 (i.e., created landscape image 304) on a raster-scan display device involves mapping the pixel information composing portrait image 302 to new memory locations in the frame buffer. For example, the mappings of several pixel information bytes are represented by special symbols in the portrait image 302 and landscape image 304 of FIG. 3. The information associated with these mappings is shown in Table 2 below.

TABLE 2

Rotational Mapping of Pixel Information
from Portrait Image 302 to Landscape Image 304.

| | Portrait | | | Landscape | | |
|---|---|---|---|---|---|---|
| Symbol | W | H | Old Mem. Loc. | W* | H* | New Mem. Loc. |
| "$" | 1 | 1 | 0 | 1 | 12 | 11 |
| "%" | 1 | 2 | 1 | 2 | 12 | 23 |
| "&" | 1 | 8 | 7 | 8 | 12 | 95 |
| "@" | 12 | 1 | 88 | 1 | 1 | 0 |
| "#" | 12 | 8 | 95 | 8 | 1 | 84 |

A mathematical formula capable of mapping pixel information from a frame buffer memory location associated with portrait image 302 to a new frame buffer memory location associated with created landscape image 304 is:

| ADDR_OUT | = (((ADDR_IN) MOD (H/N)) *W) + (((W/N) − 1) − INT((ADDR_IN) /H)) |
|---|---|
| Where: | |
| ADDR_OUT | = Address of frame buffer memory location associated with pixel information of landscape image 304 |
| ADDR_IN | = Address of frame buffer memory location associated with pixel information of portrait image 302 |
| MOD | = Modulo operation, where (A MOD B) returns the remainder of an integer division of A by B; For example, (10 MOD 3) = 1 |
| H | = Number of pixels per horizontal scan line of portrait image 302 |
| N | = Number of pixels associated with each byte of data in the frame buffer |
| W | = Number of horizontal scan lines of portrait image 302 |
| INT | = Integer operator, where INT(A) returns the integer portion of A; For example, INT(3.333) = 3 |

For example, consider the mapping of symbol "$", representing information associated with the pixel located at coordinates (W=1,H=1) in portrait image 302, to a location in the frame buffer for the proper display of created landscape image 304. In this example,

| W | = Number of horizontal scan lines of portrait image 302 |
|---|---|
| | = 12 |
| H | = Number of pixels per horizontal scan line of portrait image 302 |
| | = 8 |
| N | = Number of pixels associated with each byte of data in the frame buffer |
| | = 1 |
| ADDR_IN | = Address of frame buffer memory location associated with pixel information of portrait image 302 |
| | = 0 |
| ADDR_OUT | = Address of frame buffer memory location associated with pixel information of landscape image 304 |
| | = (((ADDR_IN) MOD (H/N)) *W) + (((W/N) − 1) − INT((ADDR_IN) /H)) |
| | = (((0) MOD (8/1)) *12) + (((12/1) − 1) − INT((0) /8)) |
| | = 0 + 11 |
| | = 11 |

Thus in order to properly display portrait image 302 rotated 90 degrees in a clockwise direction (i.e., created landscape image 304) on a raster-scan display device requires storing the information associated with a pixel located at coordinates (W=1,H=1) in portrait image 302 in frame buffer location 11.

Figure 4:
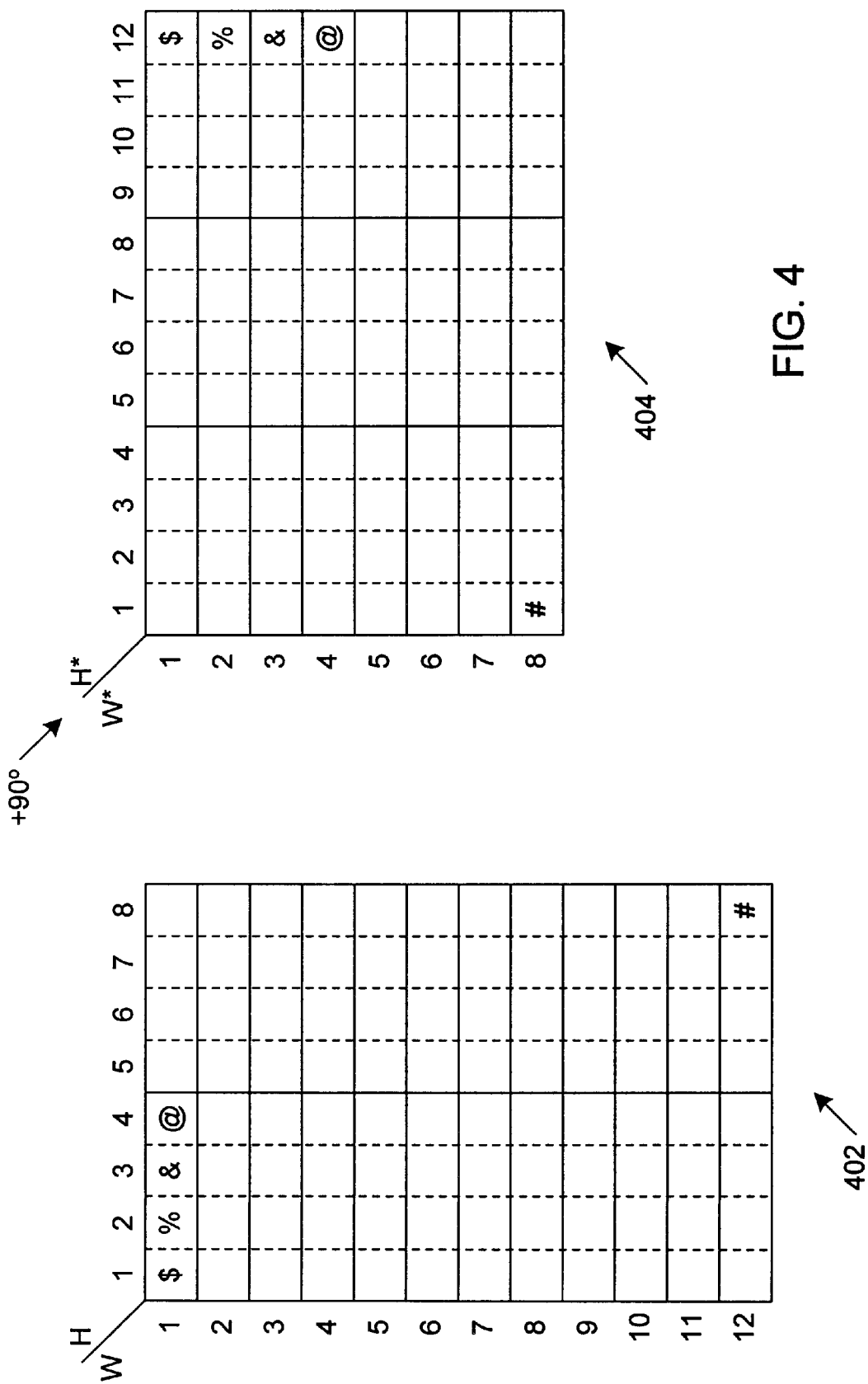
FIG. 4 is a diagram illustrating a rotation operation performed on the digital information pertaining to a raster-scan display image, wherein each byte of data in a frame buffer contains information associated with four pixels.

Turning now to FIG. 4, a second diagram illustrating an image rotation operation performed by mapping the digital information associated with pixels of a raster-scan display image is shown. In this example, each byte in the frame buffer contains the digital information associated with four sequential pixels. Portrait image 402 is a pixel grid composed of 12 horizontal lines of pixel positions (dimension W), with 8 pixel positions per line (dimension H). In this example, the digital information associated with four pixels is contained in each byte in the frame buffer; two binary bits of digital information store the information associated with each pixel. Thus four pixels are mapped to a single memory location in the frame buffer. As mentioned previously, pixel information is stored in the frame buffer in the order in which it is accessed to create an image. If frame buffer memory addresses begin at location 0 and bit positions within bytes are numbered consecutively with bit position 0 being the right-most bit position and bit position 7 being the left-most bit position within a byte, information pertaining to a pixel located at coordinates (W, H) are found at the memory locations in the frame buffer as shown in Table 3 below.

TABLE 3

Frame Buffer Memory Locations for Pixel Information of Portrait Image 402.

| W | H | Memory Location | Bits |
|---|---|---|---|
| 1 | 1 | 0 | 7–6 |
| 1 | 2 | 0 | 5–4 |
| 1 | 3 | 0 | 3–2 |
| 1 | 4 | 0 | 1–0 |
| 1 | 5 | 1 | 7–6 |
| 1 | 6 | 1 | 5–4 |
| 1 | 7 | 1 | 3–2 |
| 1 | 8 | 1 | 1–0 |
| 2 | 1 | 2 | 7–6 |
| 2 | 2 | 2 | 5–4 |
| 2 | 3 | 2 | 3–2 |
| 2 | 4 | 2 | 1–0 |
| 2 | 5 | 3 | 7–6 |
| 2 | 6 | 3 | 5–4 |
| 2 | 7 | 3 | 3–2 |
| 2 | 8 | 3 | 1–0 |
| 3 | 1 | 4 | 7–6 |
| 3 | 2 | 4 | 5–4 |
| 3 | 3 | 4 | 3–2 |
| 3 | 4 | 4 | 1–0 |
| 3 | 5 | 5 | 7–6 |
| 3 | 6 | 5 | 5–4 |
| 3 | 7 | 5 | 3–2 |
| 3 | 8 | 5 | 1–0 |
| 4 | 1 | 6 | 7–6 |
| 4 | 2 | 6 | 5–4 |
| 4 | 3 | 6 | 3–2 |
| 4 | 4 | 6 | 1–0 |
| 4 | 5 | 7 | 7–6 |
| 4 | 6 | 7 | 5–4 |
| 4 | 7 | 7 | 3–2 |
| 4 | 8 | 7 | 1–0 |
| 5 | 1 | 8 | 7–6 |
| 5 | 2 | 8 | 5–4 |
| 5 | 3 | 8 | 3–2 |
| 5 | 4 | 8 | 1–0 |
| 5 | 5 | 9 | 7–6 |
| 5 | 6 | 9 | 5–4 |
| 5 | 7 | 9 | 3–2 |
| 5 | 8 | 9 | 1–0 |
| 6 | 1 | 10 | 7–6 |
| 6 | 2 | 10 | 5–4 |
| 6 | 3 | 10 | 3–2 |
| 6 | 4 | 10 | 1–0 |
| 6 | 5 | 11 | 7–6 |
| 6 | 6 | 11 | 5–4 |
| 6 | 7 | 11 | 3–2 |
| 6 | 8 | 11 | 1–0 |
| 7 | 1 | 12 | 7–6 |
| 7 | 2 | 12 | 5–4 |
| 7 | 3 | 12 | 3–2 |
| 7 | 4 | 12 | 1–0 |
| 7 | 5 | 13 | 7–6 |
| 7 | 6 | 13 | 5–4 |
| 7 | 7 | 13 | 3–2 |
| 7 | 8 | 13 | 1–0 |
| 8 | 1 | 14 | 7–6 |
| 8 | 2 | 14 | 5–4 |
| 8 | 3 | 14 | 3–2 |
| 8 | 4 | 14 | 1–0 |
| 8 | 5 | 15 | 7–6 |
| 8 | 6 | 15 | 5–4 |
| 8 | 7 | 15 | 3–2 |
| 8 | 8 | 15 | 1–0 |
| 9 | 1 | 16 | 7–6 |
| 9 | 2 | 16 | 5–4 |
| 9 | 3 | 16 | 3–2 |
| 9 | 4 | 16 | 1–0 |
| 9 | 5 | 17 | 7–6 |
| 9 | 6 | 17 | 5–4 |
| 9 | 7 | 17 | 3–2 |
| 9 | 8 | 17 | 1–0 |
| 10 | 1 | 18 | 7–6 |
| 10 | 2 | 18 | 5–4 |
| 10 | 3 | 18 | 3–2 |
| 10 | 4 | 18 | 1–0 |
| 10 | 5 | 19 | 7–6 |
| 10 | 6 | 19 | 5–4 |
| 10 | 7 | 19 | 3–2 |
| 10 | 8 | 19 | 1–0 |
| 11 | 1 | 20 | 7–6 |
| 11 | 2 | 20 | 5–4 |
| 11 | 3 | 20 | 3–2 |
| 11 | 4 | 20 | 1–0 |
| 11 | 5 | 21 | 7–6 |
| 11 | 6 | 21 | 5–4 |
| 11 | 7 | 21 | 3–2 |
| 11 | 8 | 21 | 1–0 |
| 12 | 1 | 22 | 7–6 |
| 12 | 2 | 22 | 5–4 |
| 12 | 3 | 22 | 3–2 |
| 12 | 4 | 22 | 1–0 |
| 12 | 5 | 23 | 7–6 |
| 12 | 6 | 23 | 5–4 |
| 12 | 7 | 23 | 3–2 |
| 12 | 8 | 23 | 1–0 |

Landscape image 404 is a pixel grid composed of 8 horizontal lines of pixel positions (dimension W*), with 12 pixel positions per line (dimension H*). The translation of portrait image 402 to landscape image 404 involves rotating portrait image 402 by 90 degrees in a clockwise direction as shown in FIG. 4. Properly displaying the rotated portrait image 402 (i.e., created landscape image 404) on a raster-scan display device involves mapping the pixel information composing portrait image 402 to new memory locations in the frame buffer. For example, the mappings of several pixel information quantities are represented by special symbols in the portrait image 402 and landscape image 404 of FIG. 4. The information associated with these mappings is shown in Table 4 below.

TABLE 4

Rotational Mapping of Pixel Information from Portrait Image 402 to Landscape Image 404.

| | Portrait | | | | Landscape | | | |
|---|---|---|---|---|---|---|---|---|
| | Old Memory | | | | | | New Memory | |
| Symbol | W | H | Loc. | Bits | W* | H* | Loc. | Bits |
| "$" | 1 | 1 | 0 | 7–6 | 1 | 12 | 2 | 1–0 |
| "%" | 1 | 2 | 0 | 5–4 | 2 | 12 | 5 | 1–0 |
| "&" | 1 | 3 | 0 | 3–2 | 3 | 12 | 8 | 1–0 |
| "@" | 1 | 4 | 0 | 1–0 | 4 | 12 | 11 | 1–0 |
| "#" | 12 | 8 | 23 | 1–0 | 8 | 1 | 21 | 7–6 |

Three pieces of information are now required to map pixel information to new memory locations in the frame buffer: 1) a base address, 2) a byte position, and 3) an address offset. The above equation for ADDR_OUT with N set to 4 will produce the base address, which is the address of the first frame buffer memory location which must be modified in order for landscape image 404 to be properly displayed on a raster-scan display device. A second equation is required to determine the portions of bytes stored in the frame buffer which must be modified:

BYTE_POS=((INT((ADDR_IN/H)*N)) MOD N)

BYTE_POS is a number in the set {0, 1, 2, 3}, where byte position 0 corresponds to right-most bit positions 1-0, byte position 1 corresponds to bit positions 3-2, byte position 2 corresponds to bit positions 5-4, and byte position 3 corresponds to left-most bit positions 7-6. The third piece of information required to complete the mapping is the address offset, ADDR_OFF:

ADDR_OFF=W/N

Where frame buffer bytes hold information associated with N pixels, N bytes of pixel information in the frame buffer must be modified during the translation of portrait image 402 to landscape image 404. The portions of the bytes to be modified are identified by BYTE_POS. In the example illustrated in FIG. 4, two bits in each of four bytes of pixel information stored in the frame buffer must be modified during the pixel information translation. First, bits 7-6 of the byte at address ADDR_IN are stored at the bit locations identified by BYTE_POS at base address ADDR_OUT. Then bits 5-4 of the byte at address ADDR_IN are stored at the bit locations identified by BYTE_POS at address (ADDR_OUT+ADDR_OFF). In the third step, bits 3-2 of the byte at address ADDR_IN are stored at the bit locations identified by BYTE_POS at address (ADDR_OUT+(2*ADDR_OFF)). Lastly, bits 1-0 of the byte at address ADDR_IN are stored at the bit locations identified by BYTE_POS at address (ADDR_OUT+(3*ADDR_OFF)).

Referring to FIG. 4, consider the mapping of symbols "$", "%", "&", and "@", representing information associated with the first four pixels of portrait image 402, to locations in the frame buffer for the proper display of created landscape image 404. In this example,

| | |
|---|---|
| W | = Number of horizontal scan lines of portrait image 402 |
| | = 12 |
| H | = Number of pixels per horizontal scan line of portrait image 402 |
| | = 8 |
| N | = Number of pixels associated with each byte of data in the frame buffer |
| | = 4 |
| ADDR_IN | = Address of frame buffer memory location storing pixel information of portrait image 402 |
| | = 0 |
| ADDR_OUT | = Address of frame buffer memory location to store pixel information of landscape image 404 |
| | = (((ADDR_IN) MOD (H/N)) *W) + (((W/N) − 1) − INT((ADDR_IN) /H)) |
| | = (((0) MOD (8/4))*12) + (((12/4) − 1) − INT((0)/8)) |
| | = 0 + ((3 − 1) − 0) |
| | = 2 |
| BYTE_POS | = Relative position of the pixel information within the byte stored at a given memory location in the frame buffer |
| | = ((INT((ADDR_IN/H) *N)) MOD N) |
| | = ((INT((0/8) *4)) MOD 4) |
| | = (0 MOD 4) |
| | = 0 |
| ADDR_OFF | = Address offset for address calculations |
| | = W/N |
| | = 12/4 |
| | = 3 |

The proper display of portrait image 402 rotated 90 degrees in the clockwise direction (i.e., created landscape image 404) on a raster-scan display device requires the following actions:

1) The information associated with the first pixel of portrait image 402, located in left-most bits 7-6 of the byte associated with portrait image address 0 and represented by the symbol "$", must be stored at byte position 0 (right-most bits 1-0) of the byte at frame buffer address 2.

2) The information associated with the second pixel of portrait image 402, located in bits 5-4 of the byte associated with portrait image address 0 and represented by the symbol "%", must be stored at byte position 0 (right-most bits 1-0) of the byte at frame buffer address (2+3=5).

3) The information associated with the third pixel of portrait image 402, located in bits 3-2 of the byte associated with portrait image address 0 and represented by the symbol "&", must be stored at byte position 0 (right-most bits 1-0) of the byte at frame buffer address (2+(2*3)=8).

4) The information associated with the fourth pixel of portrait image 402, stored in bits right-most bits 1-0 of the byte associated with portrait image address 0 and represented by the symbol "@", must be stored at byte position 0 (right-most bits 1-0) of the byte at frame buffer address (2+(3*3)=11).

Similar equations may be used to properly display portrait image 402 rotated 90 degrees in a counter-clockwise direction on a raster-scan display device. These equations are:

ADDR_OUT=((((H/N)−1)−(ADDR_IN MOD (H/N)))*W)+INT(ADDR_IN/H)

BYTE_POS=(N−1)−((INT((ADDR_IN/H)*N)) MOD N)

Figure 5:
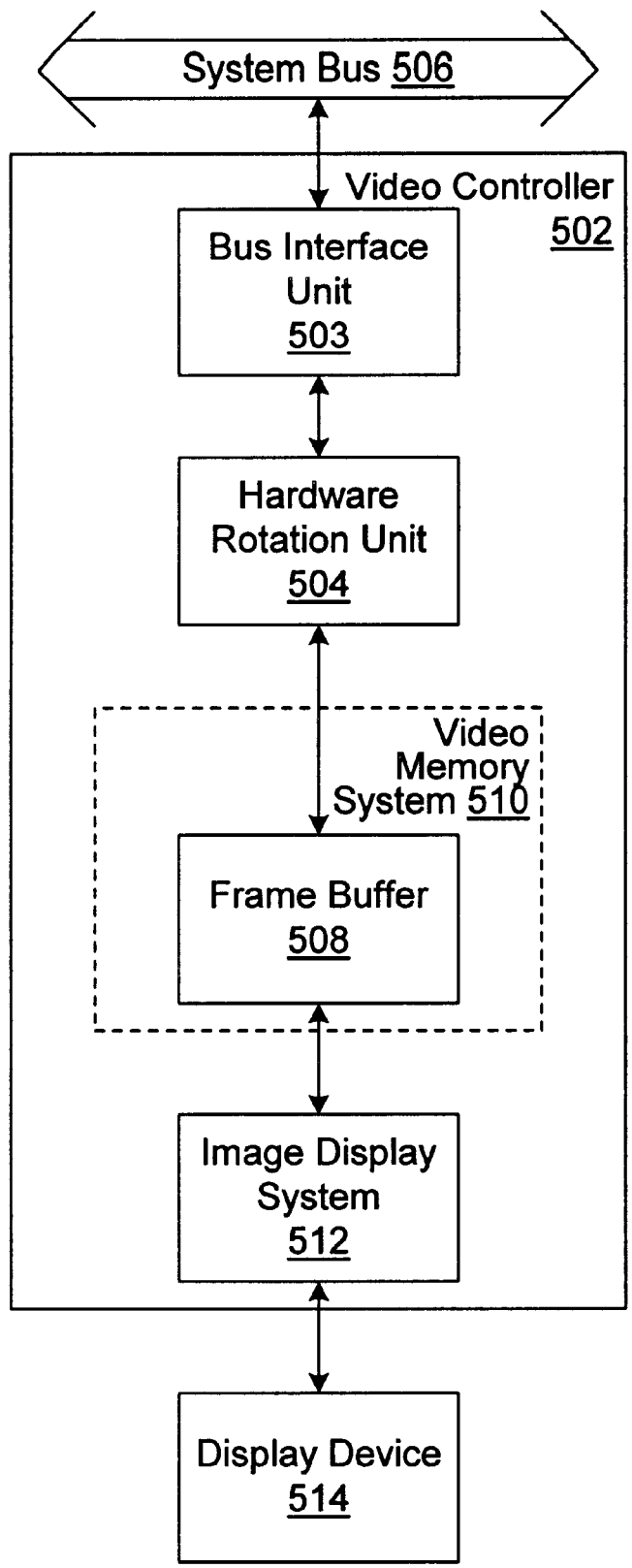
FIG. 5 is a block diagram of a video controller including a hardware rotation unit.

Turning now to FIG. 5, a block diagram of a video controller 502 including a hardware rotation unit 504 is shown. A bus interface unit 503 is coupled between a system bus 506 and hardware rotation unit 504. Hardware rotation unit 504 is coupled to a frame buffer 508, wherein frame buffer 508 is part of a video memory system 510. Frame buffer 508 is coupled to an image display system 512, and image display system 512 is coupled to a display device 514. Hardware rotation unit 504 embodies all the functions discussed above required to rotate a portrait image by 90 degrees in a clockwise or counter-clockwise direction in order to create a landscape image on a raster-scan display device. This is accomplished by hardware mapping of pixel information associated with a portrait image to the corresponding frame buffer locations necessary to properly display the image in a landscape mode.

Figure 6:
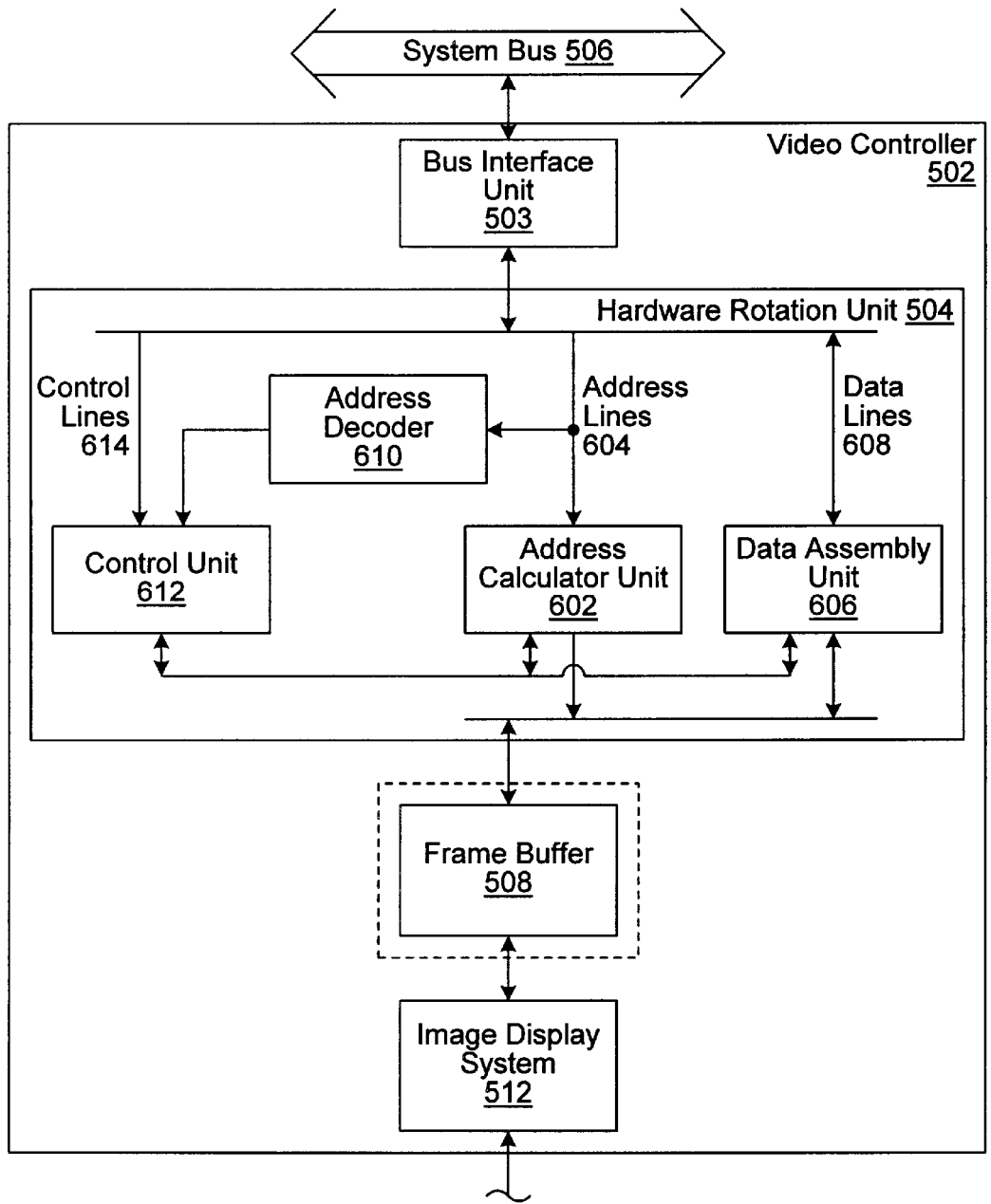
FIG. 6 is a block diagram of the hardware rotation unit including an address calculator unit, a data assembly unit, and a control unit.

FIG. 6 is a block diagram of hardware rotation unit 504 coupled between bus interface unit 503 and frame buffer 508. An address calculator unit 602 is coupled between a set of address lines 604 and frame buffer 508. A data assembly unit 606 is coupled between a set of data lines 608 and frame buffer 508. An address decoder 610 is coupled between address lines 604 and a control unit 612. Control unit 612 is coupled to a set of control lines 614, address calculator unit 602, and data assembly unit 606.

System bus 506 may be an Industry Standard Architecture (ISA) bus, Extended ISA (EISA) bus, etc. Address calculator unit 602 receives control signals from control unit 612 and address information from system bus 506 via bus interface unit 503 and address lines 604. Address calculator unit 602 performs the address mapping required to properly store the pixel information associated with a portrait image, driven on system bus 506, such that the image is rotated 90 degrees in a clockwise or counter-clockwise direction when displayed on a raster-scan display device. The operation of the hardware associated with one embodiment of the address calculator unit 602 will be described in detail below.

Data assembly unit 606 receives control signals from control unit 612 and pixel information from system bus 506 via bus interface unit 503 and data lines 608. Data assembly unit 606 performs the data extraction and modification actions required to properly display a portrait image rotated 90 degrees in a clockwise or counter-clockwise direction for display on a raster-scan display device. The operation of the hardware associated with one embodiment of the data assembly unit 606 will be described in detail below.

Control unit 612 receives control signals from system bus 506 via bus interface unit 503 and control lines 614, as well as address information from address decoder 610. Control unit 612 orchestrates the operations of address calculator unit 602 and data assembly unit 606 in the manipulation of pixel information stored in frame buffer 508 to effect a rotation of a portrait image to be displayed on a raster-scan display device by 90 degrees in a clockwise or counter-clockwise direction. The operation of a state machine as one embodiment of control unit 612 will be described in detail below.

Address decoder 610 receives address information from system bus 506 via bus interface unit 503 and address lines 604. Address decoder 610 signals control unit 612 when an address signal on address lines 604 corresponds to a memory location found in frame buffer 508.

Figure 7:
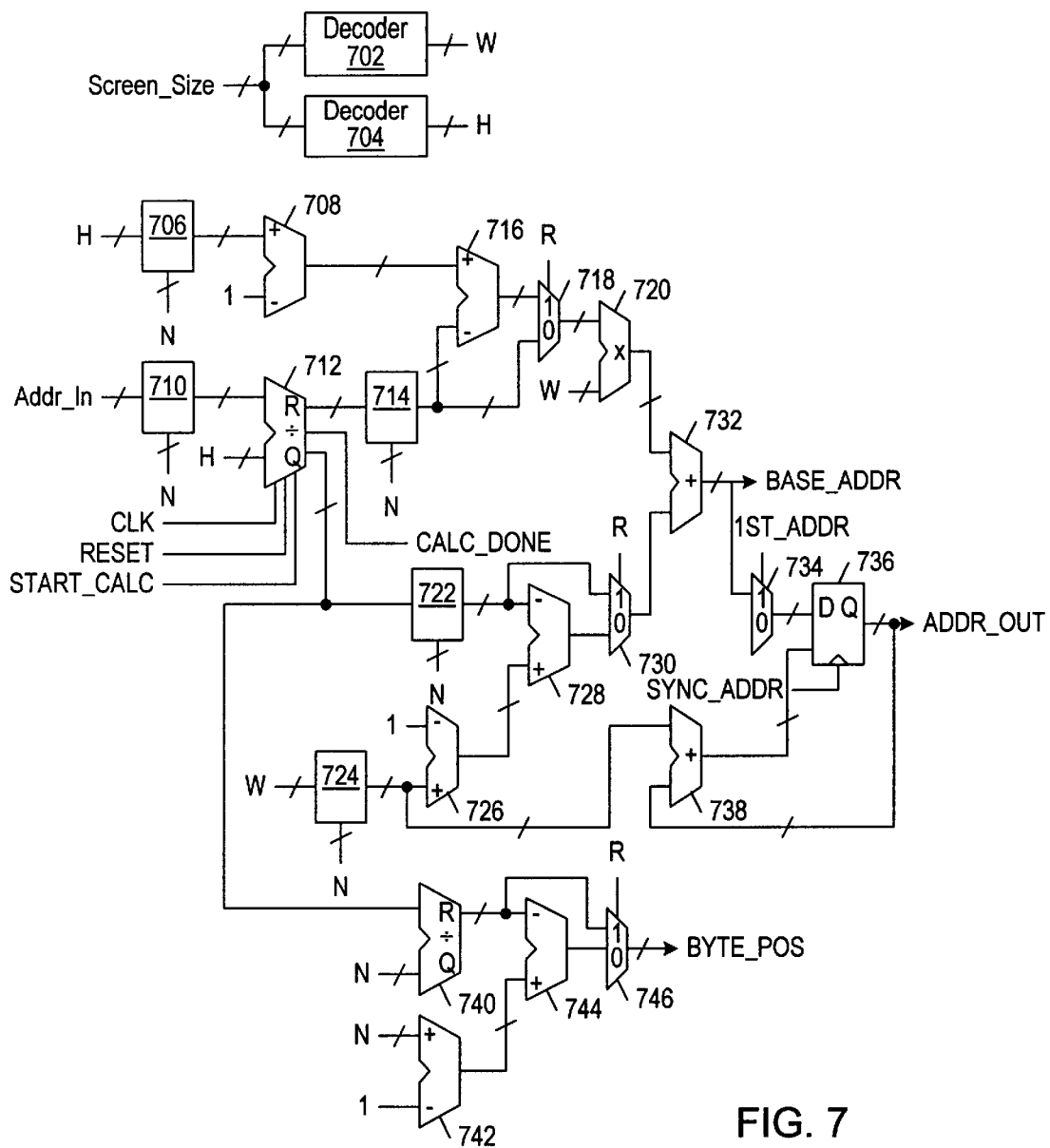
FIG. 7 is a block diagram of the address calculator unit.

Turning now to FIG. 7, a block diagram of a logic circuit representing one embodiment of address calculator unit 602 is shown. A decoder 702 has an input port driven with an input signal SCREEN_SIZE and an output port driven with an output signal W. Digital signal SCREEN_SIZE, which may be provided via a hardware selection switch or software initialization of a hardware register, encodes several possible combinations of the number of pixels per horizontal scan line (H) and the number of horizontal scan lines (W) used to display a portrait image on the screen of a raster-scan display device. Decoder 702 decodes input signal SCREEN_SIZE to produce output signal W, the binary representation of the number of horizontal scan lines present in a portrait image. Decoder 704 has an input port driven with input signal SCREEN_SIZE an output port driven with an output signal H. Signal H comprises the binary representation of the number of pixels per horizontal scan line present in a portrait image.

A shift element 706 has a data input port driven with signal H and a control port driven with a signal N. Digital signal N has a value equal to the number of pixels associated with each byte of data in the frame buffer. Like signal SCREEN_SIZE, signal N may be provided via a hardware selection switch or software initialization of a hardware register. Shift element 706 takes advantage of the fact that the numeric value of signal N is always positive and a multiple of two to effectuate a division of the numeric value of signal H by the numeric value of signal N. Shifting each bit of a binary representation of a number one bit position to the right is equivalent to dividing the number by two. Shift element 706 effectuates a division of the numeric value of signal H by the numeric value of signal N by producing an output signal comprising the binary representation of signal H wherein each bit is shifted to the right a number of times equal to half the binary value of signal N. The output port of shift element 706 is driven with an output signal comprising the binary representation of (H/N).

A subtractor 708 has an output port driven with an output signal having a value equal to the value of a signal at a "+" input port minus the value of a signal at a "−" input port. Subtractor 708 has the output signal of shift element 706, with value (H/N), at the "+" input port and a binary representation of the number "1" at the "−" input port. Thus the output port of subtractor 708 is driven an output signal comprising the binary representation of ((H/N)−1). Subtractors are usually built from full adders by adding inverters to the input lines for the number to be subtracted (i.e., the "−" input lines). Driving the carry input of the full adder with a signal representing a value of "1" effectuates a two's complement subtraction technique.

A shift element 710 has a data input port driven with a signal ADDR_IN and a control port driven with signal N. Digital signal ADDR_IN is provided by the address lines of system bus 506. Shift element 710 takes advantage of the fact that the numeric value of signal N is always positive and a multiple of two to effectuate a multiplication of the numeric value of signal ADDR_IN by the numeric value of signal N. Shifting each bit of a binary representation of a number one bit position to the left is equivalent to multiplying the number by two. Shift element 710 drives the lines of an output port with an output signal comprising the binary representation of signal H wherein each bit is shifted to the left a number of times equal to half the binary value of signal N. The output port of shift element 710 is thus driven with an output signal having a value (ADDR_IN*N).

A divider 712 has a dividend input port driven with an output signal from shift element 710, a divisor input port driven with signal H, a quotient output port labeled "Q", and a remainder output port labeled "R". The implementation of divider 712 shown also has a reset input terminal to receive a RESET signal, a clock input terminal to receive a clock signal CLK to control the timing of the steps in the division operation, an input terminal to receive a control signal START_CALC to direct the start of a division operation, and an output terminal to issue a CALC_DONE signal at the completion of a division operation. When a positive pulse is received at the START_CALC input, divider 712 produces a quotient output signal at quotient output port "Q" and a remainder output signal at remainder output port "R" based on an integer division of the dividend, with value (ADDR_IN*N), by the value of divisor signal H.

Once a division operation is complete, divider 712 drives quotient output port "Q" with a quotient output signal having a value INT((ADDR_IN*N)/H), wherein the operator INT denotes a quotient produced by an integer division operation. Divider 712 also drives remainder output port "R" with a remainder output signal having a value equal to the remainder of an integer division of the value of (ADDR_IN*N) by the value of H. This remainder value is equal to the value ((ADDR_IN*N) MOD H) wherein the operator MOD denotes the modulo operation as described above. Divider 712 also issues a positive pulse on the CALC_DONE output when a division operation is complete. Details regarding suitable integer divider algorithms are described within the publication entitled "Computer Systems Architecture" by Jean-Loup Baer, Computer Science Press, Rockville, Md., 1980. A person of ordinary skill in the art may implement a divider based on the algorithms presented in the referenced text.

A shift element 714 has a data input port driven with the remainder output signal produced by divider 712 and a control port driven with signal N. Thus the data input port is driven with a signal having a value of ((ADDR_IN*N) MOD H). Shift element 710 takes advantage of the fact that the numeric value of signal N is always positive and a multiple of two to effectuate a division of the numeric value of signal with value ((ADDR_IN*N) mod H) by the numeric value of signal N. Shift element 714 drives an output port with an output signal comprising the binary representation of the value ((ADDR_IN*N) MOD H) wherein each bit is shifted to the right a number of times equal to half the binary value of signal N. The output port of shift element 714 is thus driven with the output signal having a value of (((ADDR_IN*N) MOD H))/N), which is equal to (ADDR_IN MOD (H/N)).

A subtractor 716 has the output signal produced by subtractor 708, with value ((H/N)−1), at a "+" input port and the output signal produced by shift element 714, with value (ADDR_IN MOD (H/N)), at a "−" input port. Thus the output port of subtractor 716 is driven with an output signal having a value (((H/N)−1)−(ADDR_IN MOD (H/N))).

A multiplexer 718 has an output port driven with an output signal equal to a signal at one of two input ports based on the value of a rotate signal R at a control port. When rotate signal R has a value of 0, the pixel information associated with a portrait image is to be rotated 90 degrees in a clockwise direction, and the output port of multiplexer 718 is driven with an output signal equal to an input signal at input port labeled "0". When rotate signal R has a value of 1, the pixel information associated with a portrait image is to be rotated 90 degrees counter-clockwise, and the output port of multiplexer 718 is driven with an output signal equal to an input signal at input port labeled "1". Thus when signal R has a value of 0, the output port of multiplexer 718 is driven an output signal equal to the output signal produced by shift element 714, with value (ADDR_IN MOD (H/C)). When signal R has a value of 1, the output port of multiplexer 718 is driven with an output signal equal to the output signal produced by subtractor 716, with value (((H/N)−1)−(ADDR_IN MOD (H/N))).

A multiplier 720 has an output signal produced by multiplexer 718 at a first input port and an output signal W, produced by decoder 702, at a second input port. Multiplier 720 has an output port driven with the value produced by an integer multiplication operation performed on the values of the signals at the two input ports. Thus when rotate signal R has a value of 0, the output port of multiplexer 718 is driven with an output signal having a value (ADDR_IN MOD (H/C)), and the output port of multiplier 720 is driven with an output signal having a value ((ADDR_IN MOD (H/C))*W). When signal R has a value of 1, the output port of multiplexer 718 is driven with an output signal having a value (((H/N)−1)−(ADDR_IN MOD (H/N))), and the output port of multiplier 720 is driven with an output signal having a value ((((H/N)−1)−(ADDR_IN MOD (H/N)))*W). Details regarding suitable integer multiplier implementations are described within the publication entitled "Computer Systems Architecture" by Jean-Loup Baer, Computer Science Press, Rockville, Md., 1980. A person of ordinary skill in the art may implement a multiplier based on the algorithms presented in the referenced text.

A shift element 722 has a data input port driven with the quotient output signal produced by divider 712, with value INT((ADDR_IN*N)/H), and a control port driven with a signal N. Shift element 722 takes advantage of the fact that the numeric value of signal N is always positive and a multiple of two to effectuate a division of the numeric value of signal with value INT((ADDR_IN*N)/H) by the numeric value of signal N. The output port of shift element 722 is thus driven with an output signal having a value INT(ADDR_IN/H).

A shift element 724 has a data input port driven with output signal W produced by decoder 702 and a control port driven with signal N. Shift element 724 effectuates a division of the numeric value of signal W by the numeric value of signal N. The output port of shift element 724 is thus driven with an output signal having a value (W/N).

A subtractor 726 has an output port driven with an output signal having a value equal to the value of a signal at a "+" input port minus the value of a signal at a "−" input port. Subtractor 708 has the output signal of shift element 724, with value (W/N), at the "+" input port and the binary representation of the number "1" at the "−" input port. Thus the output port of subtractor 726 is driven with an output signal having a value ((W/N)−1).

A subtractor 728 has the output signal produced by subtractor 726, with value ((W/N)−1), at a "+" input port and the output signal produced by shift element 722, with a value INT(ADDR_IN/H), at a "−" input port. Thus the output port of subtractor 728 is driven with an output signal having a value (((W/N)−1)−INT(ADDR_IN/H)).

A multiplexer 730 has an output port driven with an output signal equal to a signal at one of two input ports based on the value of rotate signal R at a control port. When signal R has a value of 0, the output port of multiplexer 730 is driven with an output signal equal to the output signal produced by subtractor 728, with value (((W/N)−1)−INT(ADDR_IN/H)). When signal R has a value of 1, the output port of multiplexer 730 is driven with an output signal equal to the output signal produced by shift element 722, with value INT(ADDR_IN/H).

An adder 732 has an output port driven with an output signal BASE_ADDR having a value equal to the sum of the values of signals at two input ports. Adder 732 has the output signal produced by multiplier 720 at one input port and the output signal produced by multiplexer 730 at the other input port. When rotate signal R has a value of 0, the output signal produced by multiplier 720 has a value ((ADDR_IN mod (H/C))*W) and the output signal produced by multiplexer 730 has a value (((W/N)−1)−INT(ADDR_IN/H)). Rotate signal R has a value of 0 when the pixel information associated with a portrait image is to be rotated 90 degrees in a clockwise direction. Thus when a portrait image is to be rotated 90 degrees clockwise, the output port of adder 732 is driven with an output signal BASE_ADDR having a value of (((ADDR_IN mod (H/N))*W)+(((W/N)−1)−INT(ADDR_IN/H))). It will be noted that this equation matches the equation stated above for the mapping of pixel information associated with a raster-scan portrait image rotated 90 degrees clockwise.

When signal R has a value of 1, the output signal produced by multiplier 720 has a value ((((H/N)−1)−(ADDR_IN mod (H/N)))*W) and the output signal produced by multiplexer 730 has a value INT(ADDR_IN/H). Rotate signal R has a value of 1 when the pixel information associated with a portrait image is to be rotated 90 degrees in a counter-clockwise direction. Thus when a portrait image is to be rotated 90 degrees counter-clockwise, the output port of adder 732 is driven with an output signal BASE_ADDR having a value (((((H/N)−1)−(ADDR_IN MOD (H/N)))*W)+INT(ADDR_IN/H)). It will be noted that this equation matches the equation stated above for the mapping of pixel information associated with a raster-scan portrait image rotated 90 degrees counter-clockwise.

As will described in more detail below, a multiplexer 734, a register 736, and an adder 738 provide a means for adding an address offset to a base address BASE_ADDR to access frame buffer bytes when each byte stores information associated with more than one pixel.

A divider 740 has the quotient output signal produced by divider 712 at a dividend input port, a signal N at a divisor input port, a quotient output port labeled "Q", and a remainder output port labeled "R". Quotient output port "Q" of divider 712 is not used. Divider 712 drives the remainder output port "R" with a remainder output signal having a value equal to the remainder of the integer division of INT((ADDR_IN*N)/H) by the value of N. This value is also equal to ((INT((ADDR_IN/H)*N)) MOD N) where the operator MOD denotes a modulo operation as described above.

A subtractor 742 has a signal N at a "+" input port and the value "1" at a "−" input port. The output port of subtractor 742 is thus driven with an output signal having a value (N−1).

A subtractor 744 has the output signal produced by subtractor 742, with value (N−1), at a "+" input port, and the output signal produced by divider 740, with value ((INT((ADDR_IN/H)*N)) MOD N), at a "−" input port. The output port of subtractor 744 is thus driven with an output signal comprising the binary representation of the value ((N−1)−((INT((ADDR_IN/H)*N)) MOD N)).

A multiplexer 746 has an output port driven with an output signal BYTE_POS equal to a signal at one of two input ports based on the value of rotate signal R at a control port. When rotate signal R has a value of 0, the output port of multiplexer 746 is driven with an output signal equal to the output signal produced by divider 740, with value ((INT((ADDR_IN/H)*N)) MOD N). Rotate signal R has a value of 0 when the pixel information associated with a portrait image is to be rotated 90 degrees in a clockwise direction. Thus when a portrait image is to be rotated 90 degrees clockwise, output signal BYTE_POS at the output port of multiplexer 746 has a value ((INT((ADDR_IN/H)*N)) MOD N). It will be noted that this equation matches the equation stated above used to determine the byte positions of required frame buffer byte modifications during the mapping of pixel information associated with a raster-scan portrait image rotated 90 degrees clockwise.

When signal R has a value of 1, the output port of multiplexer 746 is driven with an output signal BYTE_POS equal to the output signal produced by subtractor 744, with value ((N−1)−((INT((ADDR_IN/H)*N)) MOD N)). Rotate signal R has a value of 1 when the pixel information associated with a portrait image is to be rotated 90 degrees in a counter-clockwise direction. Thus when a portrait image is to be rotated 90 degrees counter-clockwise, output signal BYTE_POS at the output port of multiplexer 746 has a value ((N−1)−((INT((ADDR_IN/H)*N)) MOD N)). It will be noted that this equation matches the equation stated above used to determine the byte positions of required frame buffer byte modifications during the mapping of pixel information associated with a raster-scan portrait image rotated 90 degrees counter-clockwise.

As mentioned above, multiplexer 734, register 736, and adder 738 provide a means for adding an address offset to a base address signal BASE_ADDR to access frame buffer bytes when each byte stores information associated with more than one pixel. Multiplexer 734 has an output port driven with an output signal equal to a signal at one of two input ports based on the value of control signal 1ST_ADDR at a control port. When signal 1ST_ADDR has a value of 1, the output port of multiplexer 734 is driven with an output signal equal to output signal BASE_ADDR produced by adder 732. When signal 1ST_ADDR has a value of 0, the output port of multiplexer 734 is driven with an output signal equal to the output signal produced by adder 738 as described below.

Register 736 is a collection of memory storage elements. Register 736 has a data input port driven with the output signal of multiplexer 734, an output port driven with an output signal ADDR_OUT, and a control port driven with signal SYNC_ADDR. When signal 1ST_ADDR has a value of 1 and register 736 is enabled by SYNC_ADDR, the output signal BASE_ADDR produced by adder 732 is stored in register 736 and appears at the output port of register 736. Thus register 736 output signal ADDR_OUT is equal to multiplexer 734 output signal BASE_ADDR when signal 1ST_ADDR has a value of 1.

Adder 738 drives an output port with an output signal having a value equal to the sum of the values of signals at two input ports. Adder 738 has the output signal produced by shift element 724, with value (W/N), at one input port and the output signal produced by register 736, with value ADDR_OUT, at the other input port. The output port of adder 738 is thus driven with an output signal having a value (ADDR_OUT+(W/N)).

During operation, signal 1ST_ADDR is set to logic 1 when base address BASE_ADDR is calculated, and a positive pulse is issued as signal SYNC_ADDR to enable register 736 to store signal BASE_ADDR. The output signal produced by register 736, ADDR_OUT, is equal to BASE_ADDR when signal 1ST_ADDR has a value of 1. When bytes in the frame buffer store information associated with more than one pixel, N has a value greater than 1, and more than one byte of pixel information must be accessed and modified during the rotational mapping operation. In this case, 1ST_ADDR is set to logic 0 after the first byte of pixel information in the frame buffer has been accessed and modified. Adder 738 produces an output signal with a value equal to the sum of the value of the output signal of shift unit 724, (W/N), and the value of signal ADDR_OUT at the output of register 736. Signal ADDR_OUT is equal to signal BASE_ADDR, thus the output signal of adder 738 has a value equal to (BASE_ADDR+(W/N)). Multiplexer 734, with control input signal 1ST_ADDR having a value of 0, produces an output signal equal to the output signal of adder 738. A positive pulse is issued as signal SYNC_ADDR to enable register 736 to store the input value (BASE_ADDR+(W/N)). After register 736 is enabled, register 736 output signal ADDR_OUT attains a value equal to (BASE_ADDR+(W/N)). Thus the next byte in the frame buffer which must be modified may now be accessed.

When register 736 output signal ADDR_OUT has a value equal to (BASE_ADDR+(W/N)), the output port of adder 738 is driven with an output signal having a value of (BASE_ADDR+(2*(W/N))). Multiplexer 734, with control input 1ST_ADDR still having a value of 0, produces an output signal equal to the output signal of adder 738. After register 736 is again enabled, register 736 output signal ADDR_OUT attains a value of (BASE_ADDR+(2*(W/N)). Thus the third byte in the frame buffer which must be modified may now be accessed. This process is continued until all bytes which must be accessed are modified.

Figure 8:
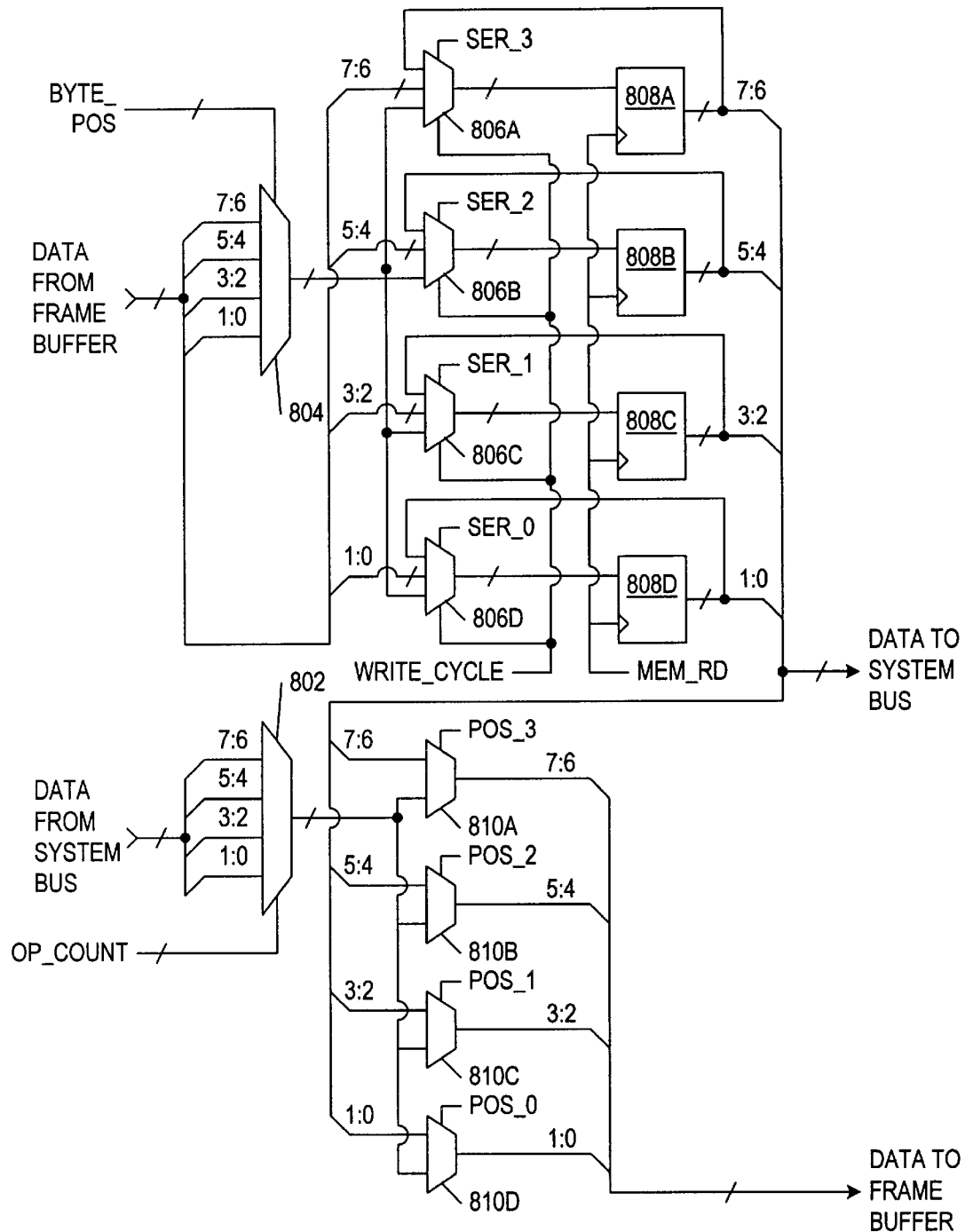
FIG. 8 is a block diagram of the data assembly unit.

Turning now to FIG. 8, a block diagram of one embodiment of data assembly unit 606 is shown. The structure and function of the embodiment will be described with the help of the example of FIG. 4. The address of the first byte of pixel information (i.e., byte 0) associated with portrait image 402 is present on the address lines of system bus 506, and the data associated with byte 0 of portrait image 402 is present on the data lines of system bus 506. A multiplexer 802 has a first input port which receives the information of bits 7-6 of the data byte driven on system bus 506 via bus interface unit 503 and data lines 608, represented by the "$" symbol in portrait image 402 of FIG. 4. A second input port of multiplexer 802 receives the information of bits 5-4 of the data byte driven on system bus 506 via bus interface unit 503 and data lines 608, represented by the "%"symbol of FIG. 4. A third input port of multiplexer 802 receives the information of bits 3-2 of the data byte driven on system bus 506 via bus interface unit 503 and data lines 608, represented by the "&" symbol of FIG. 4. A fourth input port of multiplexer 802 receives the information of bits 1-0 of the data byte driven on system bus 506 via bus interface unit 503 and data lines 608, represented by the "@"symbol of FIG. 4. A control signal OP_COUNT driving a control port selects the bits involved in the modification of frame buffer information as will be described in more detail below.

In an alternate embodiment, each byte of data in frame buffer 508 contains information associated with two pixels. In this case, multiplexer 802 may have two input ports, the first of which may receive the information of bits 7-4 of the data byte driven on system bus 506 via bus interface unit 503 and data lines 608. The second input port of multiplexer 802 may receive the information of bits 3-0 of the data byte driven on system bus 506 via bus interface unit 503 and data lines 608. The output port of multiplexer 802 may be driven with bits 7-4 of the data byte on system bus 506 when control signal OP_COUNT has a value of 0, and with bits 3-0 of the data byte on system bus 506 when control signal OP_COUNT has a value of 1. It is noted that the value of signal OP_COUNT is limited to 0 and 1 in this embodiment. Bits 3-2 of the output of multiplexer 802 may be directed to the input ports of multiplexers 810A and 810C. Bits 1-0 of the output of multiplexer 802 may be directed to the input ports of multiplexers 810B and 810D.

Control unit 612 signals address calculator unit 602 to begin the address mapping to determine the first byte in frame buffer 508 which must be modified in order to properly display rotated portrait image 402 (i.e., landscape image 404). Address calculator unit 602 also calculates the value of signal BYTE_POS required to access the portions of data bytes stored in frame buffer 508 which must be modified. When address calculator unit 602 has completed the necessary calculations, signal ADDR_OUT has a value of 2 and BYTE_POS has a value of 0 as described above. Control unit 612 issues the appropriate control signals over the bus coupling hardware rotation unit 504 to frame buffer 508 to cause frame buffer 508 to drive the data lines of said bus with the data at location 2. A first input port of a multiplexer 804 receives the information of bits 7-6 of the pixel information stored in frame buffer location 2. A second, third, and fourth input port of multiplexer 804 receives the information of bits 5-4, 3-2, and 1-0 of the pixel information stored in frame buffer location 2, respectively. Multiplexer 804 has an output port driven with an output signal equal to an input signal at one of four input ports, the selection depending on the value of control signal BYTE_POS driving a control port. In the example of FIG. 4, signal BYTE_POS has a value of 0, causing the output port of multiplexer 804 to be driven with an output signal equal to the input signal at the first input port, bits 1-0 of the pixel information stored in frame buffer location 2.

In an alternate embodiment, each byte of data in frame buffer 508 contains information associated with two pixels. In this case, multiplexer 804 may have two input ports, the first of which may receive the information of bits 7-4 of the pixel information stored in frame buffer location 2. The second input port of multiplexer 802 may receive the information of bits 3-0 of the pixel information stored in frame buffer location 2. The output port of multiplexer 804 may be driven with bits 7-4 of the pixel information stored in frame buffer location 2 when control signal BYTE_POS has a value of 1, and with bits 3-0 of the pixel information stored in frame buffer location 2 when control signal BYTE_POS has a value of 0. It is noted that the value of signal BYTE_POS is limited to 0 and 1 in this embodiment. Bits 3-2 of the output of multiplexer 804 may be directed to the input ports of multiplexers 806A and 806C. Bits 1-0 of the output of multiplexer 804 may be directed to the input ports of multiplexers 806B and 806D.

A multiplexer 806A has an output port driven with an output signal equal to an input signal at one of three input ports, the selection depending on the values of a control signal WRITE_CYCLE at a first control port and a control signal SER_3 at a second control port. The operations of multiplexers 806B–806D are similar, control signal SER_3 being replaced by SER_2, SER_1, and SER_0, respectively. Control signal WRITE_CYCLE is asserted when data present on system bus 506 is to be stored in frame buffer 508, as is the case in the example of FIG. 4. When control signal WRITE_CYCLE is asserted, multiplexers 806A–806D produce output signals equal to input signals at input ports driven with the values of bits of the data byte from the frame buffer. When control signal WRITE_CYCLE is asserted, the values of control signals SER_3, SER_2, SER_1, and SER_0 do not determine the output signals produced by multiplexers 806A–806D.

In an alternate embodiment, each byte of data in frame buffer 508 contains information associated with two pixels. In this case, multiplexers 806A and 806B may have inputs associated with one pixel, and control signals SER_3 and SER_2 may be asserted when signal OP_COUNT has a value of 0. Multiplexers 806C and 806D may have inputs associated with a second pixel, and control signals SER_1 and SER_0 may be asserted when signal OP_COUNT has a value of 1. Note that signal OP_COUNT is limited to values of 0 and 1.

Registers 808A–808D store output signals produced by multiplexers 806A–806D, respectively, when enabled by a control signal MEM_RD. In the example of FIG. 4, control signal WRITE_CYCLE is asserted, and multiplexers 806A–806D produce output signals with values corresponding to input bits of the data byte from the frame buffer. A positive pulse is issued as control signal MEM RD in order to store the output signals of multiplexers 806A–806D in registers 808A–808D. Thus the output signals of registers 808A–808D collectively comprise the unmodified data byte fetched from frame buffer 508.

A multiplexer 810A has an output port driven with an output signal equal to an input signal a one of two input ports, the selection depending on the value of a control signal POS_3 at a control port. The operations of multiplexers 810B–810D are similar, control signal POS_3 being replaced by POS_2, POS_1, and POS_0, respectively. The output signals of multiplexers 810A–810D collectively comprise a data byte to be stored in frame buffer 508. When each data byte in frame buffer 508 contains information associated with four pixels, control signal POS_0 is asserted when signal BYTE_POS has a value of 0. Control signal POS_1 is asserted when BYTE_POS has a value of 1, control signal POS_2 is asserted when BYTE_POS has a value of 2, and control signal POS_3 is asserted when BYTE_POS has a value of 3. No more than one control signal is asserted at any given time.

In an alternate embodiment, each byte of data in frame buffer 508 contains information associated with two pixels. In this case, multiplexers 810A and 810B may have inputs associated with one pixel, and both may be controlled by a signal POS_1. Multiplexers 810C and 810D may have inputs associated with a second pixel, and both may be controlled by a signal POS_0. Note that only POS_0 and POS_1 apply since BYTE_POS is limited to values of 0 and 1.

In the example of FIG. 4, address calculator unit 602 calculates a value of 0 for signal BYTE_POS as described above. Thus control signal POS_0 is asserted for the entire data modification operation, selecting bits 1-0 of data bytes stored in frame buffer 508 for modification. Initially, multiplexer 802 control signal OP_COUNT has a value of 0. The output port of multiplexer 802 is driven with an output signal having a value equal to bits 7-6 of the data from system bus 506, two bits of pixel information associated with portrait image 402 and represented by symbol "$" in FIG. 4. Multiplexer 810A control signal POS_3 is deasserted, and the output port of multiplexer 810A is driven with an output signal having a value equal to bits 7-6 of the data byte stored in frame buffer location 2. The output ports of multiplexers 810B and 810C are driven with output signals having values equal to bits 5-4 and 3-2 of the data byte stored in frame buffer location 2, respectively. Multiplexer 810D control signal POS_0 is asserted, and the output port of multiplexer 810D is driven with an output signal equal to the output signal of multiplexer 802. The data byte comprised of the collective output signals of multiplexers 810A–810D is stored at location 2 of frame buffer 508. Thus bits 7-2 of the original data byte at location 2 of frame buffer 508 are unmodified, but bits 1-0 now contain the pixel information of bits 7-6 of the data byte from system bus 506. The modified bits 1-0 of pixel information stored in location 2 of frame buffer 508 are represented by the "$" symbol in landscape image 404 of FIG. 4.

In order to complete the mapping of pixel information from portrait image 402 to landscape image 404 of FIG. 4, three more data byte modifications must occur. In FIG. 7, multiplexer 734 control signal 1ST_ADDR is set to logic 0, and a positive pulse is issued as register 736 control signal SYNC_ADDR. Signal ADDR_OUT produced by address calculator unit 602 now has a value of (BASE_ADDR+(W/N)), where BASE_ADDR has a value of 2 and (W/N) has a value of 3 as described above. Thus the data byte at location 5 of frame buffer 508 is selected for modification.

As before, control unit 612 issues the appropriate control signals over the bus coupling hardware rotation unit 504 to frame buffer 508 to cause frame buffer 508 to drive the data lines of said bus with the data at location 5. Control signal WRITE_CYCLE is still asserted, causing the output ports of multiplexers 806A–806D to be driven with output signals equal to the corresponding bits of the data byte from frame buffer 508. A positive pulse is again issued as register control signal MEM_RD, causing registers 808A–808D to store the bits of the frame buffer data byte produced by multiplexers 806A–806D. The output signals of registers 808A–808D collectively comprise the unmodified data byte fetched from location 5 of frame buffer 508.

Multiplexer 802 control signal OP_COUNT is incremented by one, producing a value of 1. The output port of multiplexer 802 is driven with an output signal equal to the values of bits 5-4 of the data from system bus 506, two bits of pixel information associated with portrait image 402 and represented by symbol "%" in FIG. 4. The value of signal BYTE_POS produced by address calculator unit 602 is still 0, and control signal POS_0 is still asserted. The output signals of multiplexers 810A–810C collectively produce bits 7-2 of the original data byte at location 5 of frame buffer 508. Multiplexer 810D control signal POS_0 is asserted, causing the output port of multiplexer 810D to be driven with an output signal equal to the output signal of multiplexer 802. The data byte comprised of the collective output signals of multiplexers 810A–810D is stored at location 5 of frame buffer 508. Thus bits 7-2 of the original data byte at location 5 of frame buffer 508 are unmodified, but bits 1-0 now contain the pixel information of bits 5-4 of the data byte from system bus 506. The modified bits 1-0 of pixel information stored in location 5 of frame buffer 508 are represented by the "%" symbol in landscape image 404 of FIG. 4.

During the third frame buffer data byte modification operation, address calculator unit 602 produces a signal ADDR_OUT with value (BASE_ADDR+(2*(W/N))). Thus the data byte at location 8 of frame buffer 508 is selected for modification. The output signals of registers 808A–808D again collectively comprise the unmodified data byte fetched from frame buffer 508. Multiplexer 802 control signal OP_COUNT is incremented by one, producing a value of 2. The output port of multiplexer 802 is driven with an output signal equal to the values of bits 3-2 of the data from system bus 506, two bits of pixel information associated with portrait image 402 and represented by symbol "&" in FIG. 4. Multiplexers 810A–810C collectively produce bits 7-2 of the original frame buffer data byte. The output port of multiplexer 810D is driven with an output signal equal to the output signal of multiplexer 802. The data byte comprised of the collective output signals of multiplexers 810A–810D is stored at location 8 of frame buffer 508. Thus bits 7-2 of the original data byte at location 8 of frame buffer 508 are unmodified, but bits 1-0 now contain the pixel information of bits 3-2 of the data byte from system bus 506. The modified bits 1-0 of pixel information stored in location 8 of frame buffer 508 are represented by the "&" symbol in landscape image 404 of FIG. 4.

During the fourth and final frame buffer data byte modification operation, address calculator unit 602 produces signal ADDR_OUT with a value (BASE_ADDR+(3*(W/N))). Thus the data byte at location 11 of frame buffer 508 is selected for modification. The output signals of registers 808A–808D again collectively comprise the unmodified data byte fetched from frame buffer 508. Multiplexer 802 control signal OP_COUNT is incremented by one, producing a value of 3. The output port of multiplexer 802 is driven with an output signal equal to the values of bits 1-0 of the data from system bus 506, two bits of pixel information associated with portrait image 402 and represented by symbol "@" in FIG. 4. Multiplexers 810A–810C collectively produce bits 7-2 of the original frame buffer data byte. The output port of multiplexer 810D is driven with an output signal equal to the output signal of multiplexer 802. The data byte comprised of the collective output signals of multiplexers 810A–810D is stored at location 11 of frame buffer 508. Thus bits 7-2 of the original data byte at location 11 of frame buffer 508 are unmodified, but bits 1-0 now contain the pixel information of bits 1-0 of the data byte from system bus 506. The modified bits 1-0 of pixel information stored in location 11 of frame buffer 508 are represented by the "@" symbol in landscape image 404 of FIG. 4.

Data assembly unit 606 also allows pixel information associated with a portrait image 402 to be reconstructed from stored pixel information associated with landscape image 404. Address calculator unit 602 calculates the appropriate addresses and determines the position of pixel information within data bytes stored in frame buffer 508 as before. Pixel information associated with landscape image 404 is fetched from frame buffer 508 and made available to the input ports of multiplexer 804. Multiplexer 806A–806D control signal WRITE_CYCLE is deasserted, and control signals SER_3, SER_2, SER_1, and SER_0 control multiplexers 806A–806D, respectively. When each data byte contains information associated with four pixels, the assertions of control signals SER_3, SER_2, SER_1, and SER_0 correspond to OP_COUNT values of 0, 1, 2, and 3, respectively.

In an alternate embodiment, each byte of data in frame buffer 508 contains information associated with two pixels. In this case, multiplexers 806A and 806B may have inputs associated with one pixel, and control signals SER_3 and SER_2 may be asserted when signal OP_COUNT has a value of 0. Multiplexers 806C and 806D may have inputs associated with a second pixel, and control signals SER_1 and SER_0 may be asserted when signal OP_COUNT has a value of 1. Note that signal OP_COUNT is limited to values of 0 and 1.

In the example of FIG. 4, a system bus 506 read request at address 0 of frame buffer 508 will result in address calculator unit 602 calculating a base address of 2 as described above. Control unit 612 issues the appropriate control signals over the bus coupling hardware rotation unit 504 to frame buffer 508 to cause frame buffer 508 to drive the data lines of said bus with the data at location 2. Signal BYTE_POS has a value of 0, causing the output port of multiplexer 804 to be driven with an output signal equal to the values of bits 1-0 of the data byte at address 2 of frame buffer 508. It will be noted that bits 1-0 of byte 2 are represented by the symbol "$" in landscape image 404 of FIG. 4. Signal OP_COUNT is initialized to 0, causing multiplexer 806A control signal SER_3 to be initially asserted. Asserted control signal SER_3 causes the output port of multiplexer 806A to be driven with an output signal equal to the output signal of multiplexer 804. Thus the output port of multiplexer 806A is driven with an output signal equal to bits 1-0 of the data word at location 2 of frame buffer 508. Control signals for multiplexers 806B–806D are deasserted, causing the output ports of multiplexers 806B–806D to be driven with output signals equal to input signals from registers 808B–808D, respectively. These values are initially undetermined. A positive pulse is issued as register control signal MEM_RD, causing registers 808A–808D to store signals at input ports. Thus the output port of register 808A is driven with an output signal equal to bits 1-0 of the data word at location 2 of frame buffer 508. The values of all other register output signals are undetermined at this point.

During the second data byte reconstruction operation, address calculator unit 602 calculates a value for signal ADDR_OUT of 5 corresponding to (BASE_ADDR+(W/N)) as described above. The data at location 5 of frame buffer 508 is made available to the input ports of multiplexer 804. Signal BYTE_POS still has a value of 0, causing the output port of multiplexer 804 to be driven with an output signal equal to bits 1-0 of the data byte at address 5 of frame buffer 508. It will be noted that bits 1-0 of byte 5 are represented by the symbol "%" in landscape image 404 of FIG. 4. Signal OP_COUNT is incremented by one to 1 and corresponding multiplexer 806B control signal SER_2 is asserted, causing the output port of multiplexer 806B to be driven with an output signal equal to the output signal of multiplexer 804. Thus the output port of multiplexer 806B is driven with an output signal equal to bits 1-0 of the data byte at location 5 of frame buffer 508. Control signals for multiplexers 806A, 806C, and 806D are deasserted, causing the output ports of these multiplexers to be driven with output signals equal to input signals produced by registers 808A, 808C, and 808D, respectively. A positive pulse is issued as register control signal MEM_RD, causing registers 808A–808D to store signals at input ports. Thus the values of bits 1-0 of the data byte at location 2 of frame buffer 508 remain at the output port of register 808A, and the output port of register 808B is driven with an output signal equal to bits 1-0 of the data word at location 5 of frame buffer 508. The values of the other register output signals are still undetermined.

During the third data byte reconstruction operation, address calculator unit 602 calculates a value for signal ADDR_OUT of 8 corresponding to (BASE_ADDR+(2*(W/N))) as described above. The data at location 8 of frame buffer 508 is made available to the input ports of multiplexer 804. Signal BYTE_POS still has a value of 0, causing the output port of multiplexer 804 to be driven with an output signal equal to bits 1-0 of the data byte at address 8 of frame buffer 508. It will be noted that bits 1-0 of byte 8 are represented by the symbol "&" in landscape image 404 of FIG. 4. Signal OP_COUNT is incremented by one to 2 and corresponding multiplexer 806C control signal SER_1 is asserted, causing the output port of multiplexer 806C to be driven with an output signal equal to the output signal of multiplexer 804. Thus the output port of multiplexer 806C is driven with an output signal equal to bits 1-0 of the data byte at location 8 of frame buffer 508. Control signals for multiplexers 806A, 808B, and 806D are deasserted, causing the output ports of these multiplexers to be driven with output signals equal to input signals produced by registers 808A, 808B, and 808D, respectively. A positive pulse is issued as register control signal MEM_RD, causing registers 808A–808D to store signals at input ports. Thus an output signal equal to bits 1-0 of the data byte at location 2 of frame buffer 508 remains at the output port of register 808A, an output signal equal to bits 1-0 of the data word at location 5 of frame buffer 508 remains at the output port of register 808B, and the output port of register 808C is driven with an output signal equal to bits 1-0 of the data word at location 8 of frame buffer 508. The value of the output signal of register 808D is still undetermined.

During the fourth and final data byte reconstruction operation, address calculator unit 602 calculates a value for signal ADDR_OUT of 11 corresponding to (BASE_ADDR+(3*(W/N))) as described above. The data at location 11 of frame buffer 508 is made available to the input ports of multiplexer 804. Signal BYTE_POS still has a value of 0, causing the output port of multiplexer 804 to be driven with an output signal equal to bits 1-0 of the data byte at address 11 of frame buffer 508. It will be noted that bits 1-0 of byte 11 are represented by the symbol "@" in landscape image 404 of FIG. 4. Signal OP_COUNT is incremented by one to 3 and corresponding multiplexer 806D control signal SER_0 is asserted, causing the output port of multiplexer 806D to be driven with an output signal equal to the output signal of multiplexer 804. Thus the output port of multiplexer 806D is driven with an output signal equal to bits 1-0 of the data byte at location 11 of frame buffer 508. Control signals at control ports of multiplexers 806A–806C are deasserted, causing the output ports of these multiplexers to be driven with output signals equal to input signals produced by registers 808A–808C, respectively. A positive pulse is issued as register control signal MEM_RD, causing registers 808A–808D to store signals at input ports. The output signal of register 808A remains equal to bits 1-0 of the data byte at location 2 of frame buffer 508, the output signal of register 808B remains equal to bits 1-0 of the data byte at location 5 of frame buffer 508, the output signal of register 808C remains equal to bits 1-0 of the data word at location 8 of frame buffer 508, and the output port of register 808D is driven with an output signal equal to bits 1-0 of the data word at location 11 of frame buffer 508.

The data byte associated with portrait image 402, reconstructed from pixel information associated with landscape image 404 stored in frame buffer 508, is now comprised of the collective output signals of register 808A–808D. This data byte may now be driven on the data lines of system bus 506.

Figure 9:
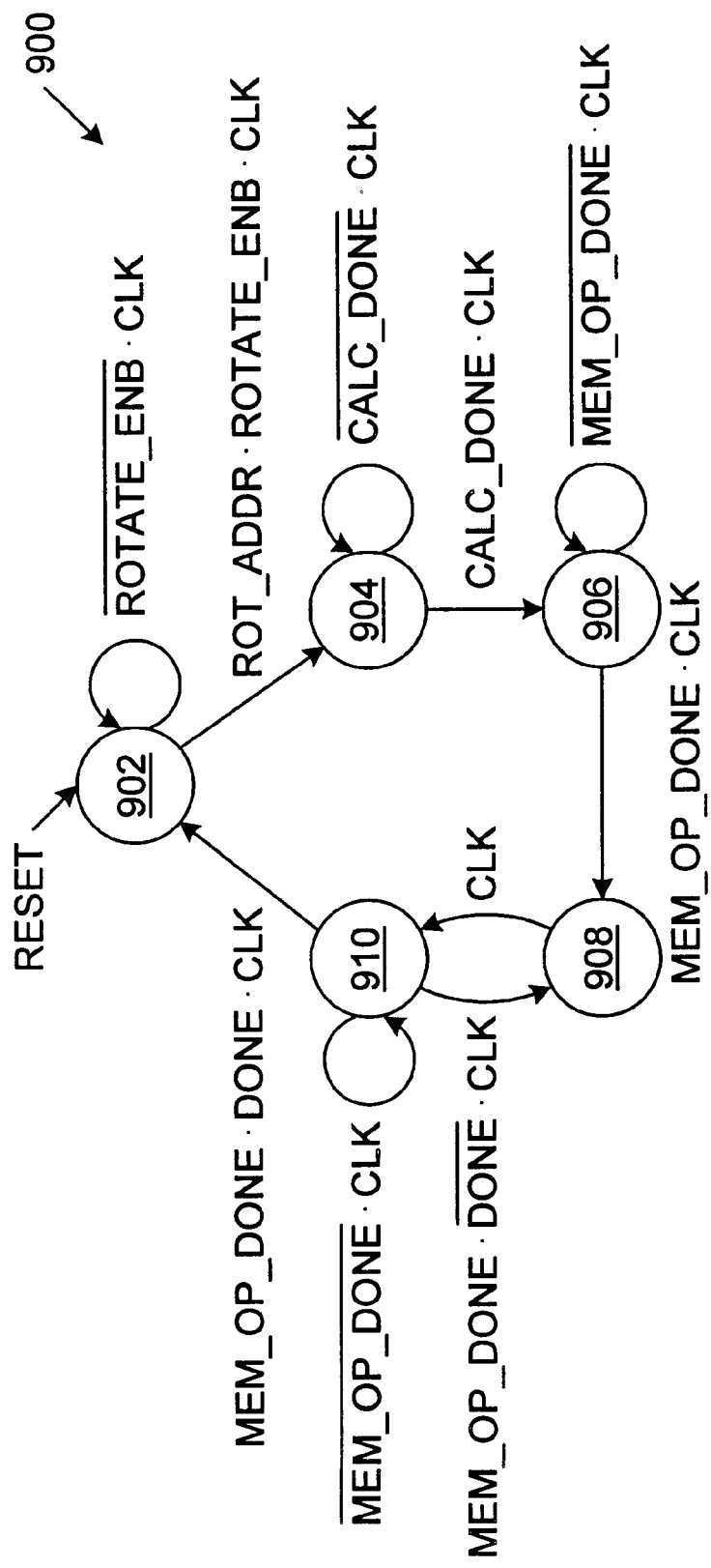
FIG. 9 is a diagram of an algorithmic state machine embodied within the control unit for describing the operational sequence thereof.
Figure 10:
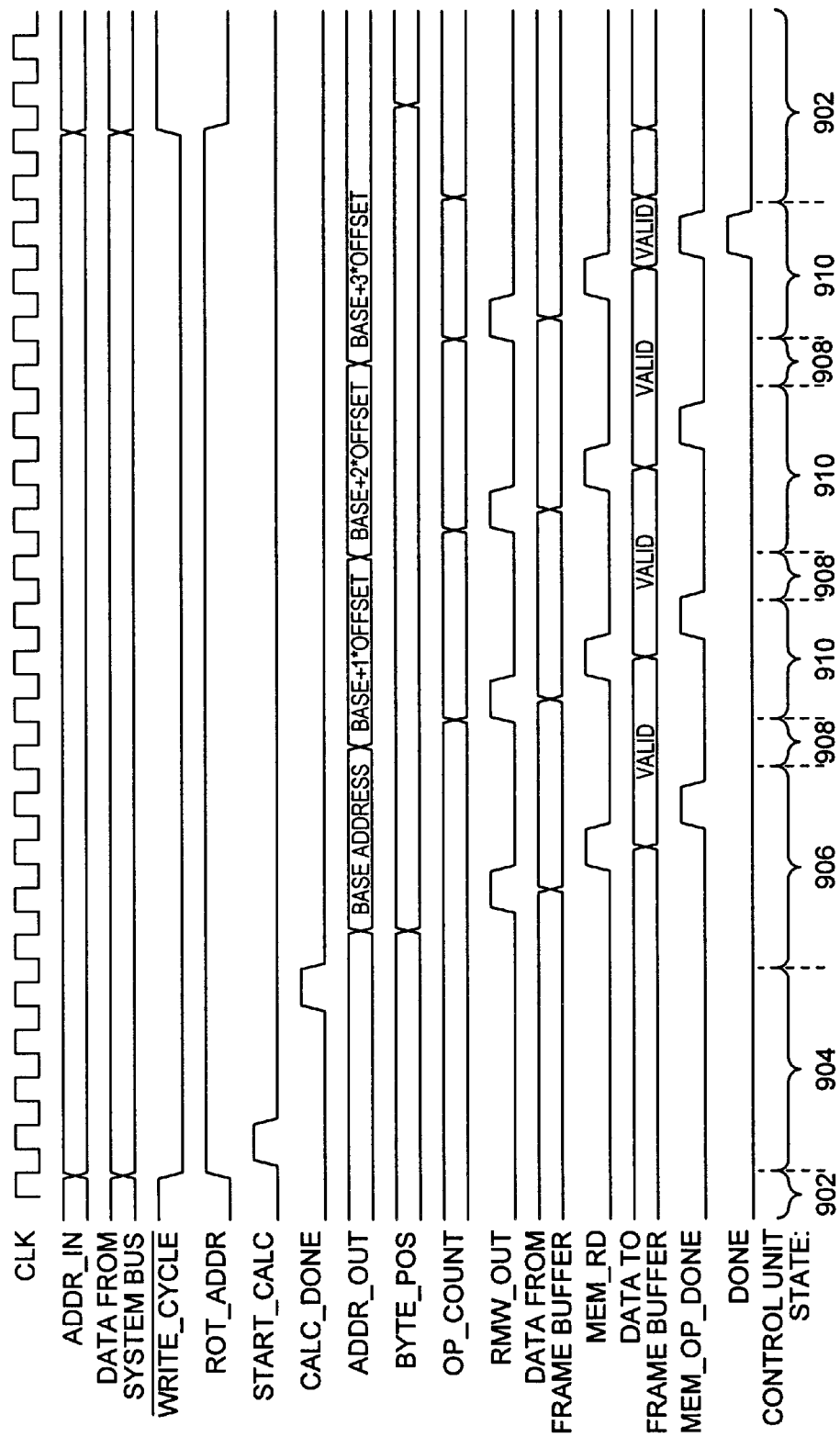
FIG. 10 is a timing diagram which illustrates the sequence of operations involved in a video data write operation wherein each byte of data in a frame buffer contains information associated with four pixels.

Turning now to FIG. 9, a diagram of an algorithmic state machine 900 embodied within control unit 612 of hardware rotation unit 504 is shown. FIG. 10 is a timing diagram which illustrates the sequence of operations involved in a video data write operation wherein each byte of data in a frame buffer 508 contains information associated with four pixels. Referring collectively to FIGS. 9 and 10, a write operation involving the transfer of pixel information associated with a portrait image from system bus 506 to frame buffer 508 in a manner which facilitates the display of this information as a landscape image will now be described.

State machine 900 includes a total of five states 902, 904, 906, 908, and 910. State machine 900 enters idle state 902 when an external RESET signal is asserted, and remains in state 902 when not involved in an image rotation operation. State machine 900 transitions from idle state 902 to state 904 when signals ROT_ADDR and ROTATE_ENB are both asserted at a rising edge of clock signal CLK. Rotate enable signal ROTATE_ENB is asserted when pixel information associated with a portrait image is to be stored in frame buffer 508 in a manner which facilitates the display of the image in a landscape format (i.e., rotated 90 degrees in a clockwise or counter-clockwise direction). Signal ROT_ADDR is asserted by address decoder 610 when an address of a memory location within frame buffer 508 is detected on the address lines 604 from system bus 506 via bus interface unit 503.

In state 904, control unit 612 issues a positive pulse as signal START_CALC, causing address calculator unit 602 to calculate the base address signal BASE_ADDR and byte position signal BYTE_POS. Address calculator unit 602 asserts signal CALC_DONE when the calculation of the base address signal BASE_ADDR is complete. State machine 900 transitions to state 906 when signal CALC_DONE is asserted at a rising edge of clock signal CLK.

In state 906, control unit 612 drives signal 1ST_ADDR with a value of logic 1 and issues a positive pulse as signal SYNC_ADDR during the first cycle of clock signal CLK. Pulse SYNC_ADDR causes address calculator unit 602 to issue signal ADDR_OUT with the same value as BASE_ADDR. During the second cycle of clock signal CLK while in state 906, control unit 612 issues a positive pulse as signal RMW_OUT. Assertion of signal RMW_OUT causes frame buffer 508 to drive the data lines of the bus coupling hardware rotation unit 504 to frame buffer 508 with the data located at address ADDR_OUT. Data assembly unit 606 then modifies the data byte from the frame buffer to include pixel information from the data byte on data lines 608 from system bus 506 via bus interface unit 503. During the third cycle of clock signal CLK while in state 906, control unit 612 issues a positive pulse as signal MEM_RD. Data assembly unit 606 then drives the data lines of the bus coupling hardware rotation unit 504 to frame buffer 508 with the modified data byte. During the fourth cycle of clock signal CLK while in state 906, control unit 612 issues a positive pulse as signal MEM_OP_DONE, causing frame buffer 508 to store the modified pixel information on the data lines of the bus coupling hardware rotation unit 504 to frame buffer 508 at frame buffer address ADDR_OUT. The assertion of signal MEM_OP_DONE with signal DONE deasserted causes state machine 900 to transition from state 906 to state 908 at the next rising edge of clock signal CLK.

During state 908, control unit 612 drives signal 1ST_ADDR with a value of logic 0 and issues a positive pulse as signal SYNC_ADDR, causing address calculator unit 602 to calculate the value of (ADDR_OUT+(W/R)) and issue signal ADDR_OUT with this value. State machine 900 transitions from state 908 to state 910 at the next rising edge of clock signal CLK.

In state 910, control unit 612 issues a positive pulse as signal RMW_OUT during the first cycle of clock signal CLK. The assertion of signal RMW_OUT causes frame buffer 508 to drive the data lines of the bus coupling hardware rotation unit 504 to frame buffer 508 with the data located at address ADDR_OUT. Data assembly unit 606 then modifies the data byte from the frame buffer to include pixel information from the data byte on the data lines 608 from system bus 506 via bus interface unit 503. During the second cycle of clock signal CLK, control unit 612 issues a positive pulse as signal MEM_RD. Data assembly unit 606 then drives the data lines of the bus coupling hardware rotation unit 504 to frame buffer 508 with the modified data byte. During the third cycle of clock signal CLK, control unit 612 issues a positive pulse as signal MEM_OP_DONE, causing frame buffer 508 to store the modified pixel information on the data lines of the bus coupling hardware rotation unit 504 to frame buffer 508 at frame buffer address ADDR_OUT.

State machine 900 remains in state 910 until control unit 612 asserts signal MEM_OP_DONE. Control unit 612 asserts signal DONE to bus interface unit 503 when an image rotation operation has been completed. If signals MEM_OP_DONE and DONE are both asserted at a rising edge of clock signal CLK, state machine 900 transitions to state 902. If signal MEM_OP_DONE is asserted and signal DONE is deasserted at a rising edge of clock signal CLK, state machine 900 transitions from state 910 back to state 908. In the example of FIG. 10, two more bytes of pixel information in frame buffer 508 must be modified before the image rotation operation is completed. The above process continues until four data bytes associated with a landscape image and stored in frame buffer 508 are modified to include two-bit segments of a data byte associated with a portrait image.

In an alternate embodiment, each byte of data in frame buffer 508 contains information associated with two pixels. In this case, only two memory bytes must be modified during a write operation. Signal OP_COUNT may have a value of 0 during the modification of the first memory byte, and may have a value of 1 during the modification of the second memory byte.

Figure 11:
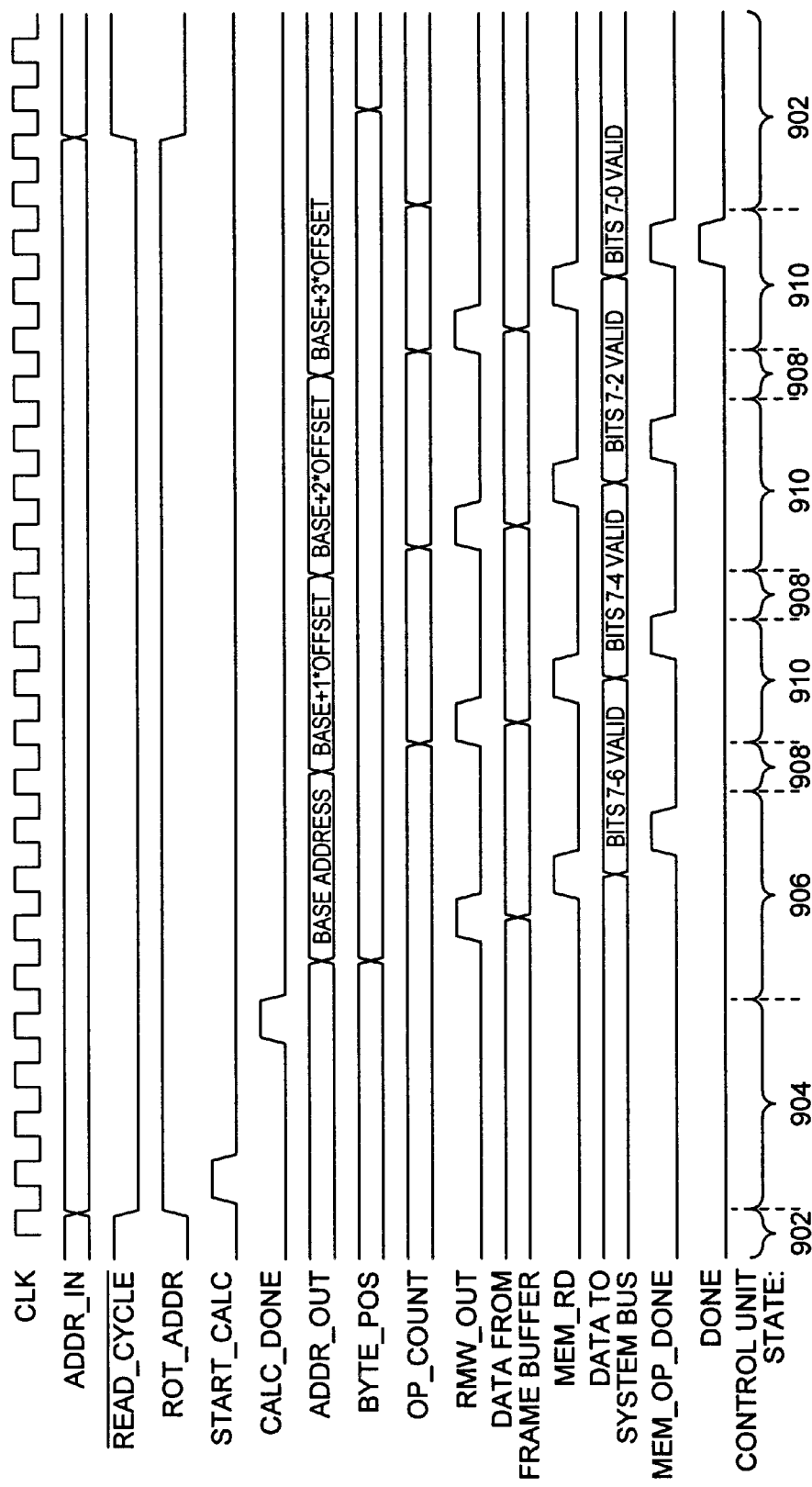
FIG. 11 is a timing diagram which illustrates the sequence of operations involved in a video data read operation wherein each byte of data in a frame buffer contains information associated with four pixels.

FIG. 11 is a timing diagram which illustrates the sequence of operations involved in a video data read operation wherein each byte of data in a frame buffer 508 contains information associated with four pixels. Referring collectively to FIGS. 9 and 11, a read operation involving the reconstruction of a byte of information associated with a portrait image from four bytes of information associated with a landscape image and stored in frame buffer 508 will now be described.

In idle state 902, signal OP_COUNT is initialized to 0. State machine 900 transitions from idle state 902 to state 904 when signals ROT_ADDR and ROTATE_ENB are both asserted at a rising edge of clock signal CLK. In state 904, control unit 612 issues a positive pulse as signal START_CALC, causing address calculator unit 602 to calculate the base address signal BASE_ADDR and byte position signal BYTE_POS. Address calculator unit 602 asserts signal CALC_DONE when the calculation of the base address signal BASE_ADDR is complete. State machine 900 transitions to state 906 at a rising edge of clock signal CLK with signal CALC_DONE asserted.

In state 906, control unit 612 drives signal 1ST_ADDR with a value of logic 1 and issues a positive pulse as signal SYNC_ADDR during the first cycle of clock signal CLK. Pulse SYNC_ADDR causes address calculator unit 602 to issue signal ADDR_OUT with the same value as BASE_ADDR. During the second cycle of clock signal CLK while in state 906, control unit 612 issues a positive pulse as signal RMW_OUT. Assertion of signal RMW_OUT causes frame buffer 508 to drive the data lines of the bus coupling hardware rotation unit 504 to frame buffer 508 with the data located at address ADDR_OUT. Signal OP_COUNT has a value of 0, and corresponding control signal SER_3 is asserted. Data assembly unit 606 extracts bits 1-0 from the data byte obtained from the frame buffer 508 at address ADDR_OUT. During the third cycle of clock signal CLK while in state 906, control unit 612 issues a positive pulse as signal MEM_RD. Data assembly unit 606 then drives the data lines of the bus coupling hardware rotation unit 504 to system bus 506 with a data byte having valid bits 7-6 equal to bits 1-0 of the data byte in frame buffer 508 at address ADDR_OUT. During the fourth cycle of clock signal CLK while in state 906, control unit 612 issues a positive pulse as signal MEM_OP_DONE. The assertion of signal MEM_OP_DONE with signal DONE deasserted causes state machine 900 to transition from state 906 to state 908 at the next rising edge of clock signal CLK.

During state 908, control unit 612 drives signal 1ST_ADDR with a value of logic 0 and issues a positive pulse as signal SYNC_ADDR, causing address calculator unit 602 to calculate the value of (ADDR_OUT+(W/R)) and issue signal ADDR_OUT with this value. State machine 900 transitions from state 908 to state 910 at the next rising edge of clock signal CLK.

In state 910, control unit 612 issues a positive pulse as signal RMW_OUT during the first cycle of clock signal CLK. The assertion of signal RMW_OUT causes frame buffer 508 to drive the data lines of the bus coupling hardware rotation unit 504 to frame buffer 508 with the data located at address (ADDR_OUT+(W/R)). Control unit 612 increments the value of OP_COUNT by 1 to 1, and corresponding control signal SER_2 is asserted. Data assembly unit 606 then extracts bits 1-0 of the data byte from frame buffer 508 at address (ADDR_OUT+(W/R)). During the second cycle of clock signal CLK, control unit 612 issues a positive pulse as signal MEM_RD. Data assembly unit 606 then drives the data lines of the bus coupling hardware rotation unit 504 to system bus 506 with a data byte having valid bits 7-6 equal to bits 1-0 of the data byte in frame buffer 508 at address ADDR_OUT and valid bits 5-4 equal to bits 1-0 of the data byte in frame buffer 508 at address (ADDR_OUT+(W/R)). During the third cycle of clock signal CLK, control unit 612 issues a positive pulse as signal MEM_OP_DONE.

State machine 900 remains in state 910 until control unit 612 asserts signal MEM_OP_DONE. Control unit 612 asserts signal DONE to bus interface unit 503 when an image rotation operation has been completed. If signals MEM OP_DONE and DONE are both asserted at a rising edge of clock signal CLK, state machine 900 transitions to state 902. If signal MEM_OP_DONE is asserted and signal DONE is deasserted at a rising edge of clock signal CLK, state machine 900 transitions from state 910 back to state 908. In the example of FIG. 11, two more bytes of pixel information in frame buffer 508 must be accessed before the data byte reconstruction effort is completed. The above process continues until a valid byte associated with a portrait image is reconstructed from two-bit segments of four data bytes associated with a landscape image and stored in frame buffer 508.

In an alternate embodiment, each byte of data in frame buffer 508 contains information associated with two pixels. In this case, a valid byte associated with a portrait image is reconstructed from four-bit segments of two data bytes associated with a landscape image and stored in frame buffer 508. Signal OP_COUNT may have a value of 0 during the accessing of the first memory byte, and may have a value of 1 during the accessing of the second memory byte. Control signals SER_3 and SER_2 may be asserted when signal OP_COUNT has a value of 0, and control signals SER_1 and SER_0 may be asserted when signal OP_COUNT has a value of 1.

It will be appreciated to those skilled in the art having the benefit of this disclosure that this invention is believed to be capable of rotating a raster-scan display image 90 degrees in a clockwise or counter-clockwise direction. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. An image rotation unit, comprising:
   a frame buffer having a plurality of locations for storing pixel data, wherein each of said locations represents N pixels;
   an address calculator unit coupled to said frame buffer and configured to receive an input address for a first image, said input address corresponding to one of said locations in said frame buffer, and wherein for each said input address said address calculator unit is further configured to provide N output addresses for a second image, each output address corresponding to one of said locations in said frame buffer; and
   a data assembly unit coupled to said frame buffer and configured to receive pixel data associated with said input address and configured to modify a portion of the pixel data for one pixel stored in each location in said frame buffer corresponding to said N output addresses and leaving the remaining pixel data unmodified in each location in said frame buffer corresponding to said N output addresses.

2. The image rotation unit of claim 1, wherein said second image is a rotated version of said first image.

3. The image rotation unit of claim 1, wherein said address calculator unit calculates a base address and an offset address, and wherein said address calculator unit derives each of said N output addresses from said base address and said offset address.

4. The image rotation unit of claim 1 wherein said address calculator unit provides a byte position signal, wherein said data assembly unit receives said byte position signal, and wherein said byte position signal indicates which pixel data is modified in each location in said frame buffer corresponding to said N output addresses.

5. The image rotation unit of claim 1 further comprising a control unit configured to receive said input address, wherein said control unit sequences the operation of said address calculator unit and said data assembly unit.

6. The image rotation unit of claim 3 wherein said addresses calculator unit calculates said base address according to a sum of a third term and a fifth term minus a sixth term, wherein:
- a first term equal to the quotient of a division of a number of pixels per horizontal line (H) of said first image by the number of pixels (N) associated with each location in said frame buffer;
- a second term equal to said input address (ADDR_IN) modulo said first term, wherein said modulo operation produces the remainder of an integer division of said input address (ADDR_IN) by said first term;
- said third term equal to the product of said second term and a number of horizontal lines (W) of said first image;
- a fourth term equal to the quotient of a division of the number of horizontal lines of said first image (W) by the number of pixels (N) associated with each location in said frame buffer;
- said fifth term equal to said fourth term minus the quantity 1; and
- said sixth term equal to the quotient of an integer division of said input address (ADDR_IN) by the number of pixels per horizontal line (H) of said first image.

7. The image rotation unit of claim 3 wherein said addresses calculator unit calculates said offset address according to a number of horizontal lines (W) of said first image divided by a number of pixels (N) associated with each location in said frame buffer.

8. The image rotation unit of claim 4 wherein said address calculator unit calculates said byte position signal according to a third term, wherein:
- a first term equal to the quotient of a division of said input address (ADDR_IN) by a number of pixels per horizontal line (H) of said first image;
- a second term equal to the product of said first term and a number of pixels (N) associated with each location in said frame buffer; and
- said third term equal to said second term modulo the number of pixels (N) associated with each location in said frame buffer, wherein said modulo operation produces the remainder of an integer division of said second term by the number of pixels (N) associated with location in said frame buffer.

9. An image rotation device, comprising:
- a frame buffer having a plurality of locations for storing pixel data, wherein each of said locations represents N pixels; and
- a hardware rotation unit coupled to said frame buffer and configured to receive an input address and pixel data corresponding to a first image, wherein said hardware rotation unit stores said pixel data in said frame buffer as a second image, wherein said pixel data is stored in locations in said frame buffer according an output address generated by said hardware rotation unit for each input address, wherein said output address is generated according to a sum of a third term and a fifth term minus a sixth term, wherein:
  - a first term equal to the quotient of a division of a number of pixels per horizontal line (H) of said first image by the number of pixels (N) associated with each location in said frame buffer;
  - a second term equal to said input address (ADDR_IN) modulo said first term, wherein said modulo operation produces the remainder of an integer division of said input address (ADDR_IN) by said first term;
  - said third term equal to the product of said second term and a number of horizontal lines (W) of said first image;
  - a fourth term equal to the quotient of a division of the number of horizontal lines of said first image (W) by the number of pixels (N) associated with each location in said frame buffer;
  - said fifth term equal to said fourth term minus the quantity 1; and
  - said sixth term equal to the quotient of an integer division of said input address (ADDR_IN) by the number of pixels per horizontal line (H) of said first image.

10. The image rotation device as recited in claim 9, wherein said second image is a rotated version of said first image.

11. The image rotation device as recited in claim 9, wherein said pixel data received by said hardware rotation unit represents N pixels, and wherein said hardware rotation unit stores data for each one of said N pixels in a location in said frame buffer according to a multiple of an offset address added to said output address, wherein said offset address is calculated by said hardware rotation unit according to a number of horizontal lines (W) of said first image divided by a number of pixels (N) associated with each location in said frame buffer.

12. The image rotation device as recited in claim 11, wherein said hardware rotation unit stores data for each one of said N pixels according to a byte position, wherein only data corresponding to said byte position is modified in each location in said frame buffer.

13. The image rotation device as recited in claim 12, wherein said hardware rotation unit calculates said byte position according to a third term, wherein:
- a first term equal to the quotient of a division of said input address (ADDR_IN) by a number of pixels per horizontal line (H) of said first image;
- a second term equal to the product of said first term and a number of pixels (N) associated with each location in said frame buffer; and
- said third term equal to said second term modulo the number of pixels (N) associated with each location in said frame buffer, wherein said modulo operation produces the remainder of an integer division of said second term by the number of pixels (N) associated with location in said frame buffer.

14. A computer system comprising:
- a video controller coupled between a system bus and a display device, said video controller adapted to:
  - receive an input address and corresponding pixel data associated with a first image from said system bus; and
  - transmit display information to said display device; and
- said video controller comprises:
  - a frame buffer having a plurality of locations for storing pixel data, wherein each of said locations represents N pixels;
  - an address calculator unit coupled to said frame buffer and configured to receive an input address for a first image, said input address corresponding to one of said locations in said frame buffer, and wherein for each said input address said address calculator unit is further configured to provide N output addresses for a second image, each output address corresponding to one of said locations in said frame buffer;

a data assembly unit coupled to said frame buffer and configured to receive pixel data associated with said input address and configured to modify a portion of the pixel data for one pixel stored in each location in said frame buffer corresponding to said N output addresses and leaving the remaining pixel data unmodified in each location in said frame buffer corresponding to said N output addresses; and an image display system coupled between said frame buffer and said display device, said display system adapted to receive data from said frame buffer, convert said data received from said frame buffer into said display information, and transmit said display information to said display device.

15. A computer system comprising:

a video controller coupled between a system bus and a display device, said video controller adapted to:

receive an input address and corresponding pixel data associated with a first image from said system bus; and transmit display information to said display device; and said video controller comprises:

a frame buffer having a plurality of locations for storing pixel data, wherein each of said locations represents N pixels;

a hardware rotation unit coupled to said frame buffer and configured to receive an input address and pixel data corresponding to a first image, wherein said hardware rotation unit stores said pixel data in said frame buffer as a second image, wherein said pixel data is stored in locations in said frame buffer according an output address generated by said hardware rotation unit for each input address, wherein said output address is generated according to a sum of a third term and a fifth term minus a sixth term, wherein:

a first term equal to the quotient of a division of a number of pixels per horizontal line (H) of said first image by the number of pixels (N) associated with each location in said frame buffer;

a second term equal to said input address (ADDR_IN) modulo said first term, wherein said modulo operation produces the remainder of an integer division of said input address (ADDR_IN) by said first term;

said third term equal to the product of said second term and a number of horizontal lines (W) of said first image;

a fourth term equal to the quotient of a division of the number of horizontal lines of said first image (W) by the number of pixels (N) associated with each location in said frame buffer;

said fifth term equal to said fourth term minus the quantity 1; and said sixth term equal to the quotient of an integer division of said input address (ADDR_IN) by the number of pixels per horizontal line (H) of said first image; and an image display system coupled between said frame buffer and said display device, said display system adapted to receive data from said frame buffer, convert said data received from said frame buffer into said display information, and transmit said display information to said display device.

16. A method for modifying pixel information associated with a raster-scan portrait image to display a raster-scan landscape image, comprising:

receiving an input address corresponding to a pixel data location for said portrait image;

receiving pixel data associated with said input address, wherein said pixel data represents N pixels;

calculating a base address derived from said input address, an offset address, and a byte position;

modifying a location in a frame buffer with said pixel data, wherein said location corresponds to said base address added to a multiple of said offset address, wherein only the portion of said location indicated by said byte position is modified; and repeating said modifying N−1 times using an increasing multiple of said offset address for each repetition, wherein data for a different one of said N pixels represented by said pixel data is used to modify said location for each repetition.

17. The method as recited in claim 16, wherein said calculating a base address comprises:

calculating a first term equal to the quotient of a division of a number of pixels per horizontal line (H) of said portrait image by the number of pixels (N) associated with said location in said frame buffer;

calculating a second term equal to said input address (ADDR_IN) modulo the value of said first term, wherein said modulo operation produces the remainder of an integer division of said input address (ADDR_IN) by said first term;

calculating a third term equal to the product of said second term and a number of horizontal lines (W) of said portrait image;

calculating a fourth term equal to the quotient of a division of the number of horizontal lines of said portrait image (W) by the number of pixels (N) associated with said location in said frame buffer;

calculating a fifth term equal to the value of said fourth term minus the quantity 1;

calculating a sixth term equal to the quotient of an integer division of said input address (ADDR_IN) by the number of pixels per horizontal line (H) of said portrait image; and subtracting said sixth term from the sum of said third term and said fifth term.

18. The method as recited in claim 16, wherein said calculating an offset address comprises dividing a number of horizontal lines (W) of said portrait image by the number of pixels (N) associated with said location in said frame buffer.

19. The method as recited in claim 16, wherein said calculating a byte position comprises:

calculating a first term equal to the quotient of a division of said input address (ADDR_IN) by a number of pixels per horizontal line (H) of said portrait image;

calculating a second term equal to the product of said first term and a number of pixels (N) associated with said location in said frame buffer; and performing a modulo operation of said second term with the number of pixels (N) associated with said location in said frame buffer, wherein said modulo operation produces the remainder of an integer division of said second term by the number of pixels (N) associated with said location in said frame buffer.

* * * * *